United States Patent
Ojha et al.

(10) Patent No.: US 11,700,169 B2
(45) Date of Patent: Jul. 11, 2023

(54) METHODS, APPARATUSES AND COMPUTER PROGRAM PRODUCTS FOR GENERATING RESPONDER ALERT DATA OBJECTS BASED ON GLOBAL ALERT POLICY DATA OBJECTS AND INLINE ALERT POLICY DATA OBJECTS

(71) Applicants: ATLASSIAN PTY LTD, Sydney (AU); ATLASSIAN INC, San Francisco, CA (US)

(72) Inventors: Akhil Ojha, Bangalore (IN); Shreyasi Agrawal, Delhi (IN); Mandeep Kumawat, Falna (IN); Vishakha Vaidya, Bangalore (IN)

(73) Assignees: ATLASSIAN PTY LTD, Sydney (AU); ATLASSIAN INC, San Francisco, CA (US)

( * ) Notice: Subject to any disclaimer, the term of this patent is extended or adjusted under 35 U.S.C. 154(b) by 92 days.

(21) Appl. No.: 17/448,615

(22) Filed: Sep. 23, 2021

(65) Prior Publication Data
US 2023/0093091 A1    Mar. 23, 2023

(51) Int. Cl.
*H04L 41/0686* (2022.01)
*H04L 41/22* (2022.01)
*H04L 41/0681* (2022.01)
*G06F 16/23* (2019.01)

(52) U.S. Cl.
CPC ...... *H04L 41/0686* (2013.01); *G06F 16/2379* (2019.01); *H04L 41/0681* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 2002/0049838 A1* | 4/2002 | Sylor | H04L 43/10 709/224 |
| 2019/0311115 A1* | 10/2019 | Lavi | G06F 21/44 |
| 2022/0417096 A1* | 12/2022 | Vutukuri | H04L 41/0866 |

OTHER PUBLICATIONS

Apparatuses, Computer-Implemented Methods, and Computer Program Products for Improved Data Event Root Cause Identification and Remediation, U.S. Appl. No. 17/644,988.
Apparatuses, Methods, and Computer Program Products for Predictive Determinations of Causal Change Identification for Services Incidents, U.S. Appl. No. 17/559,563.

(Continued)

*Primary Examiner* — Angela Nguyen
(74) *Attorney, Agent, or Firm* — Alston & Bird LLP

(57) ABSTRACT

Various embodiments herein described are directed to methods, apparatuses and computer program products configured for improving alert generation and management in network computer systems. In some embodiments, a client device may generate one or more responder alert data objects for an incident data object based at least in part on global alert policy data object(s) and inline alert policy data object(s). Additional example embodiments provide various example global alert policy creation user interfaces, global alert policy edit user interfaces, inline alert policy creation user interfaces, and/or inline alert policy edit user interfaces that facilitate various user inputs and software operations in an incident alert and management platform.

20 Claims, 21 Drawing Sheets

(56) References Cited

OTHER PUBLICATIONS

Machine-Learning-Based Techniques for Determining Response Team Predictions for Incident Alerts in a Complex Platform, U.S. Appl. No. 17/454,838.
Machine-Learning-Based Techniques for Predictive Monitoring of a Software Application Framework, U.S. Appl. No. 17/127,216.
Machine-Learning-Based Techniques for Predictive Monitoring of a Software Application Framework, U.S. Appl. No. 17/657,237.
Methods, Apparatuses and Computer Program Products for Generating Service Health Status Data Objects and Rendering Health Status Monitoring User Interfaces, U.S. Appl. No. 17/656,529.
Predictive Monitoring of Software Application Frameworks Using Machine-Learning-Based Techniques, U.S. Appl. No. 17/486,293.

* cited by examiner

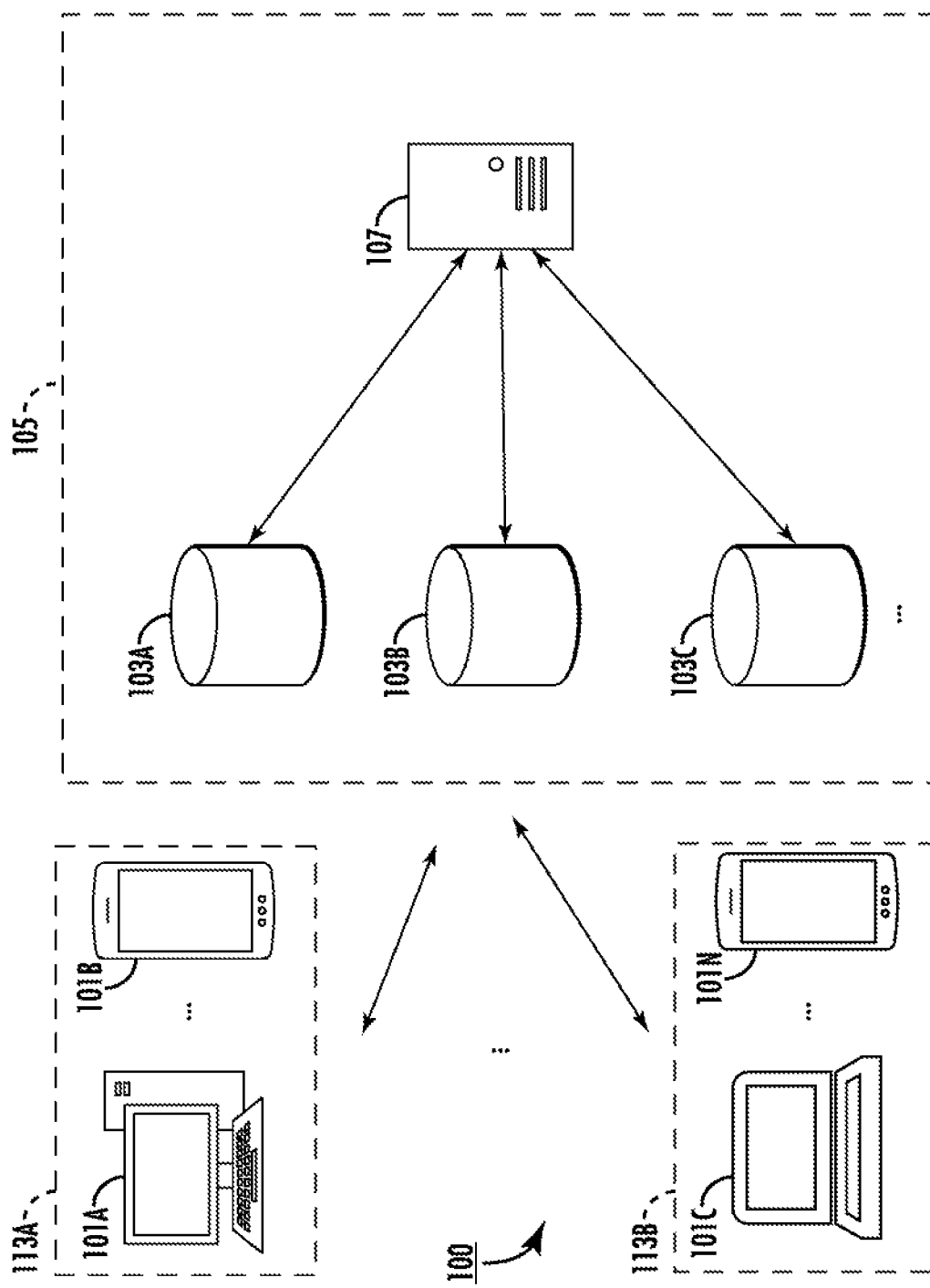

CREATE ISSUE — 2002

IMPORT ISSUES | CONFIGURE FIELDS ∨

ASSIGN TO THE
PRIORITY
[① MEDIUM ∨] ○

LABLES
[ ∨ ]

APPEARANCE
[ ]

AFFECTED SERVICES
[ ]

SERVICE
[NONE ∨]

RESPONDER ALERTS CONFIGURATION
● NONE
○ DON'T CREATE RESPONDER ALERTS
○ CREATE RESPONDER ALERTS IMMEDIATELY
○ CREATE ALERTS IF INCIDENT NOT CLOSED BY SLA
— 2004

ENABLE STAKEHOLDER COMMUNICATION
○ ENABLE
— 2006

☐ CREATE ANOTHER [CREATE] [CANCEL]

METHODS, APPARATUSES AND
COMPUTER PROGRAM PRODUCTS FOR
GENERATING RESPONDER ALERT DATA
OBJECTS BASED ON GLOBAL ALERT
POLICY DATA OBJECTS AND INLINE
ALERT POLICY DATA OBJECTS

BACKGROUND

Applicant has identified many technical deficiencies and problems associated with generating and managing alerts in complex network computer systems.

BRIEF SUMMARY

In general, embodiments of the present disclosure provide methods, apparatus, systems, computing devices, and/or the like for improving alert generation and management in network computer systems. In particular, embodiments of the present disclosure may programmatically generate responder alert data objects based at least in part on global alert policy data objects and/or inline alert policy data objects.

In accordance with various examples of the present disclosure, an apparatus is provided. The apparatus comprises at least one processor and at least one non-transitory memory comprising program code. The at least one non-transitory memory and the program code are configured to, with the at least one processor, cause the apparatus to at least: in response to receiving an incident data object associated with an organization identifier, retrieve one or more global alert policy data objects from a global alert policy data repository associated with the organization identifier; determine whether a global alert policy data object of the one or more global alert policy data objects corresponds to the incident data object based at least in part on incident metadata associated with the incident data object and condition metadata associated with the one or more global alert policy data objects; in response to determining that the global alert policy data object corresponds to the incident data object, generate an inline alert policy data object associated with the incident data object and based at least in part on the global alert policy data object; receive, via an inline alert policy edit user interface rendered on a display of a client device associated with the organization identifier, inline alert policy edit metadata associated with alert metadata of the inline alert policy data object; and in response to receiving the inline alert policy edit metadata, generate one or more responder alert data objects associated with the incident data object based at least in part on the inline alert policy data object and the inline alert policy edit metadata.

In some embodiments, the at least one non-transitory memory and the program code are configured to, with the at least one processor, cause the apparatus to: receive, via a global alert policy creation user interface rendered on the display of the client device, global alert policy creation metadata, wherein the global alert policy creation metadata is associated with the organization identifier; generate the one or more global alert policy data objects based at least in part on the global alert policy creation metadata; and store the one or more global alert policy data objects in the global alert policy data repository.

In some embodiments, the global alert policy creation metadata defines at least one condition metadata and at least one alert metadata associated with the organization identifier.

In some embodiments, when generating the inline alert policy data object, the at least one non-transitory memory and the program code are configured to, with the at least one processor, cause the apparatus to: replicate the global alert policy data object as the inline alert policy data object; and establish a data association between the inline alert policy data object and the incident data object.

In some embodiments, in response to receiving the incident data object associated with the organization identifier, the at least one non-transitory memory and the program code are configured to, with the at least one processor, cause the apparatus to: determine, based at least in part on the incident metadata associated with the incident data object, whether to generate the one or more responder alert data objects.

In some embodiments, the at least one non-transitory memory and the program code are configured to, with the at least one processor, cause the apparatus to: in response to determining not to generate the one or more responder alert data objects, generate a no-alert electronic indication; and transmit the no-alert electronic indication to the client device associated with the organization identifier.

In some embodiments, the at least one non-transitory memory and the program code are configured to, with the at least one processor, cause the apparatus to: in response to determining to generate the one or more responder alert data objects, determine a creation time metadata associated with the one or more responder alert data objects, wherein the creation time metadata indicates a creation time associated with the one or more responder alert data objects, and generate the one or more responder alert data objects at the creation time.

In some embodiments, the at least one non-transitory memory and the program code are configured to, with the at least one processor, cause the apparatus to: determine whether an existing inline alert policy data object is associated with the incident data object.

In some embodiments, the at least one non-transitory memory and the program code are configured to, with the at least one processor, cause the apparatus to: in response to determining that the existing inline alert policy data object is not associated with the incident data object, trigger retrieving one or more default alert policy data objects.

In some embodiments, the at least one non-transitory memory and the program code are configured to, with the at least one processor, cause the apparatus to: in response to determining that the existing inline alert policy data object is associated with the incident data object, render the inline alert policy edit user interface.

In some embodiments, the at least one non-transitory memory and the program code are configured to, with the at least one processor, cause the apparatus to: receive update metadata associated with the incident data object; and update the one or more responder alert data objects based at least in part on the update metadata.

In some embodiments, the update metadata indicates an updated status metadata associated with the incident data object. In some embodiments, the at least one non-transitory memory and the program code are configured to, with the at least one processor, cause the apparatus to: determine whether the updated status metadata indicates that the incident data object is closed; and in response to determining that the updated status metadata indicates that the incident data object is closed, update the one or more responder alert data objects.

In accordance with various embodiments of the present disclosure, a computer-implemented method is provided. In some embodiments, the computer-implement method comprises in response to receiving an incident data object associated with an organization identifier, retrieving one or more global alert policy data objects from a global alert policy data repository associated with the organization identifier; determining whether a global alert policy data object of the one or more global alert policy data objects corresponds to the incident data object based at least in part on incident metadata associated with the incident data object and condition metadata associated with the one or more global alert policy data objects; in response to determining that the global alert policy data object corresponds to the incident data object, generating an inline alert policy data object associated with the incident data object and based at least in part on the global alert policy data object; receiving, via an inline alert policy edit user interface rendered on a display of a client device associated with the organization identifier, inline alert policy edit metadata associated with alert metadata of the inline alert policy data object; and in response to receiving the inline alert policy edit metadata, generating one or more responder alert data objects associated with the incident data object based at least in part on the inline alert policy data object and the inline alert policy edit metadata In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprising an executable portion configured to: in response to receiving an incident data object associated with an organization identifier, retrieve one or more global alert policy data objects from a global alert policy data repository associated with the organization identifier; determine whether a global alert policy data object of the one or more global alert policy data objects corresponds to the incident data object based at least in part on incident metadata associated with the incident data object and condition metadata associated with the one or more global alert policy data objects; in response to determining that the global alert policy data object corresponds to the incident data object, generate an inline alert policy data object associated with the incident data object and based at least in part on the global alert policy data object; receive, via an inline alert policy edit user interface rendered on a display of a client device associated with the organization identifier, inline alert policy edit metadata associated with alert metadata of the inline alert policy data object; and in response to receiving the inline alert policy edit metadata, generate one or more responder alert data objects associated with the incident data object based at least in part on the inline alert policy data object and the inline alert policy edit metadata.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Figure 1B:
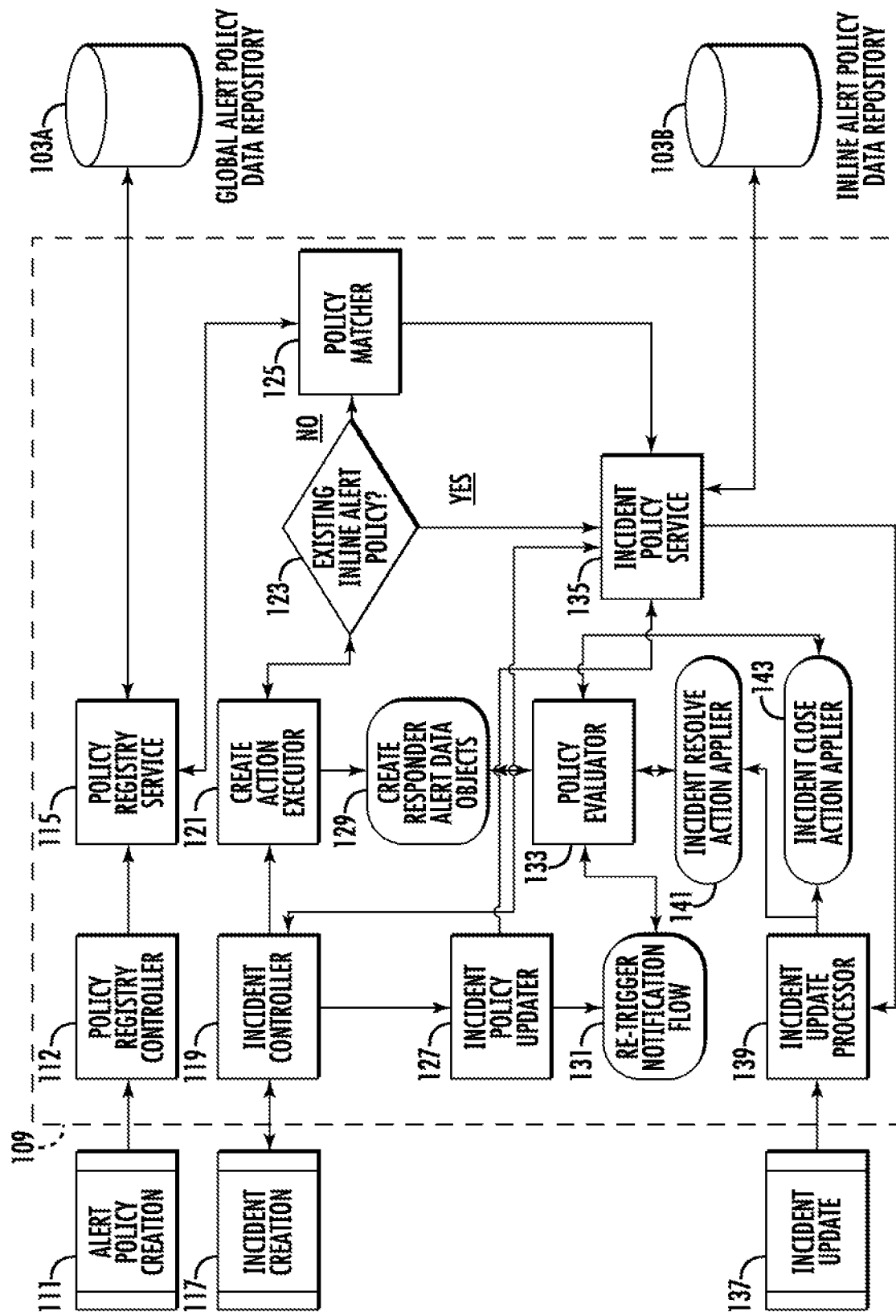
Figure 2:
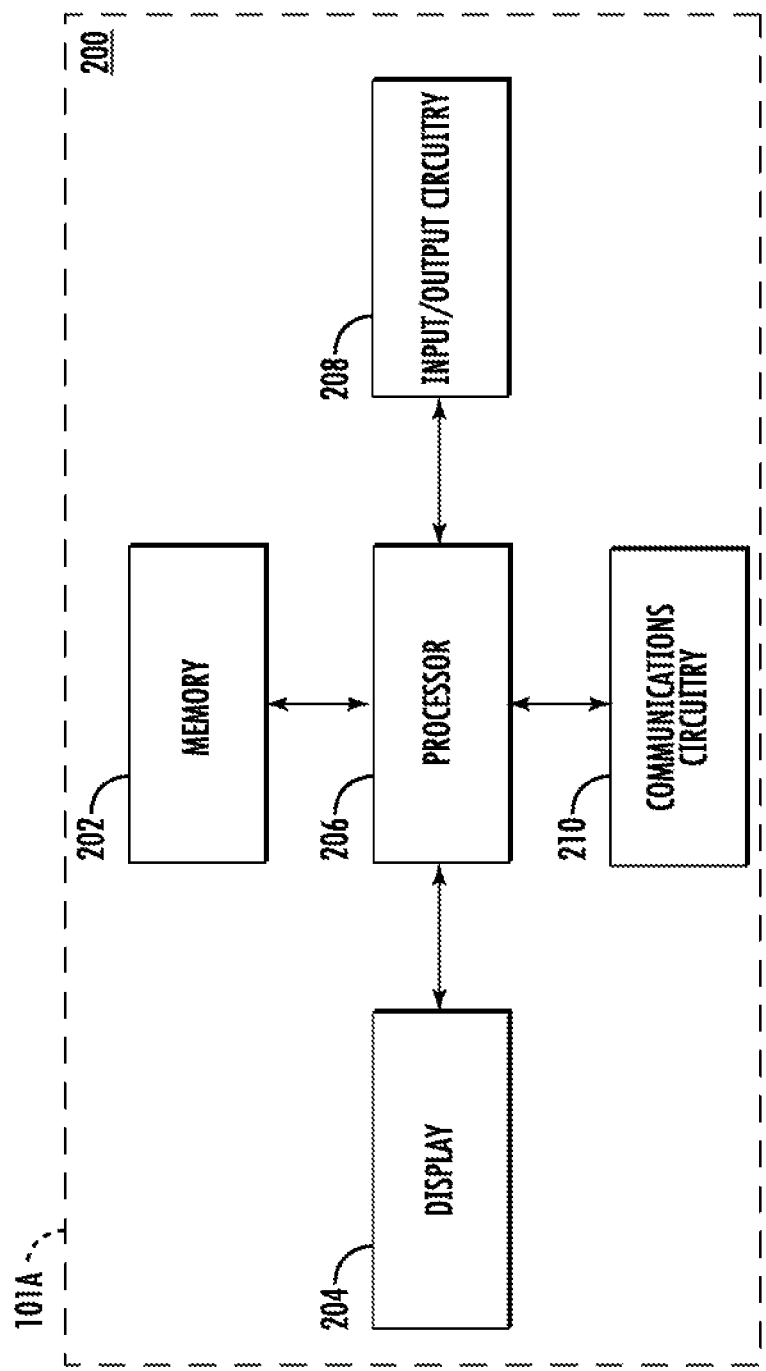
Figure 3:
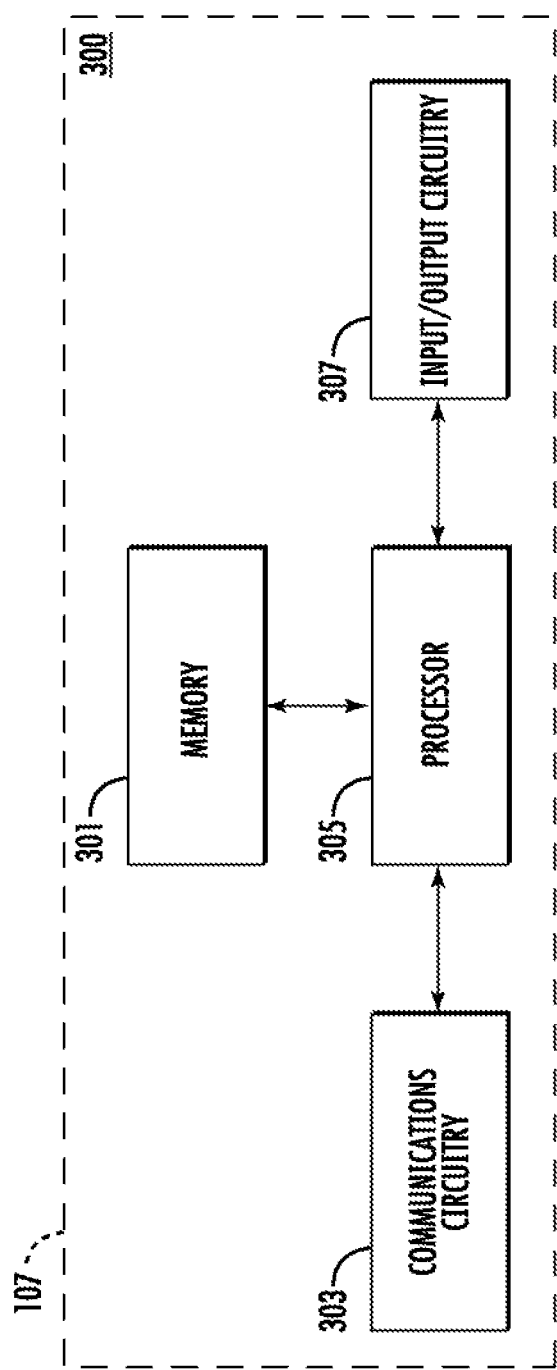
Figure 4:
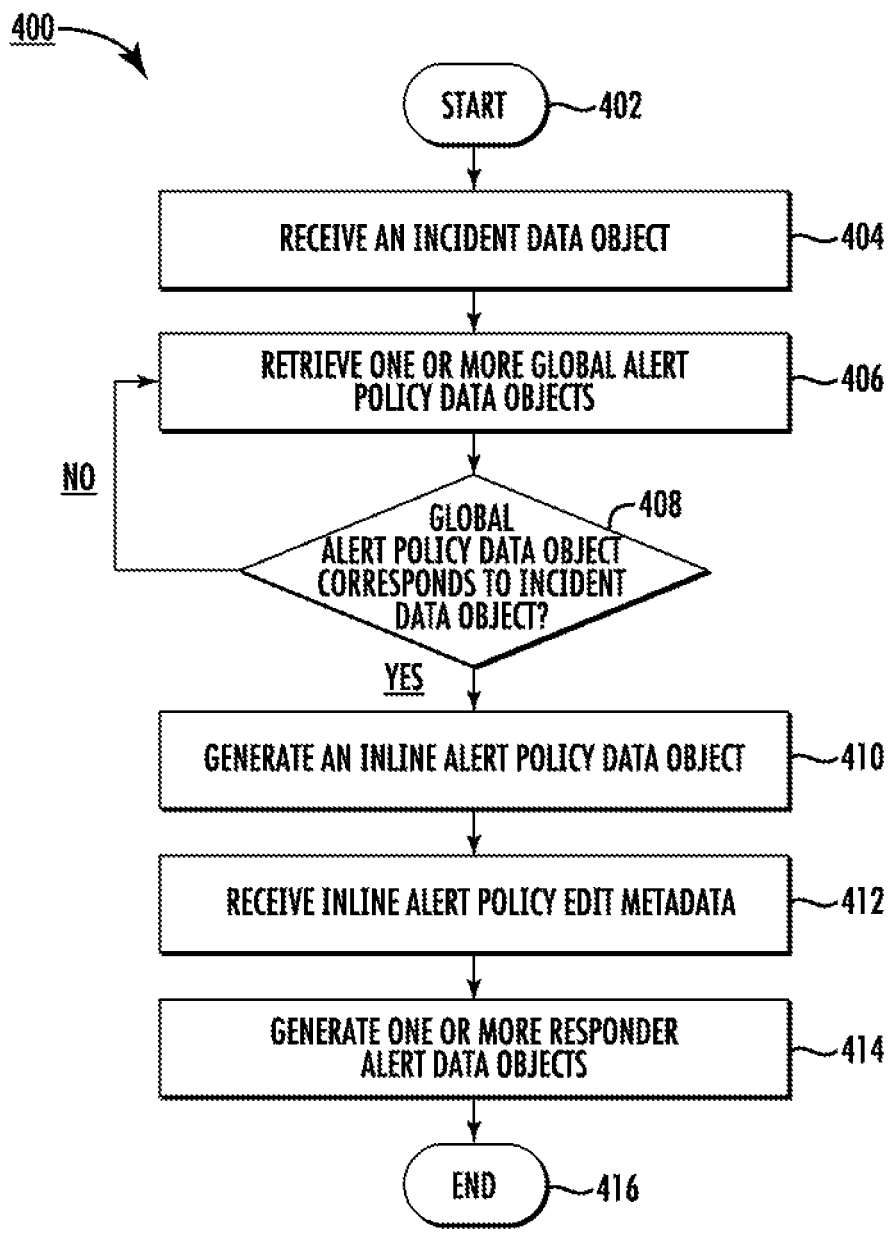
Figure 5:
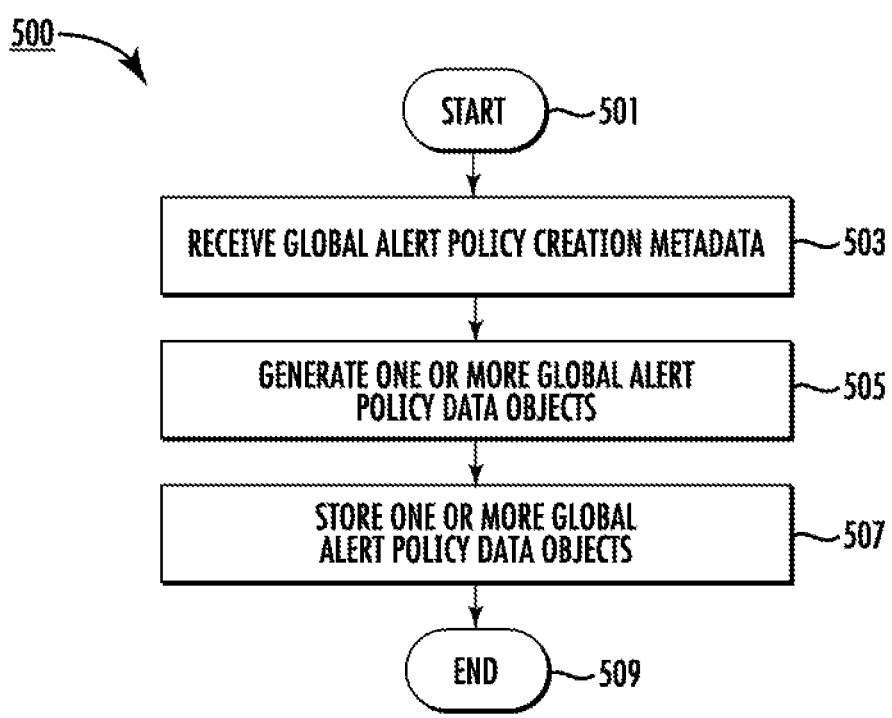
Figure 6:
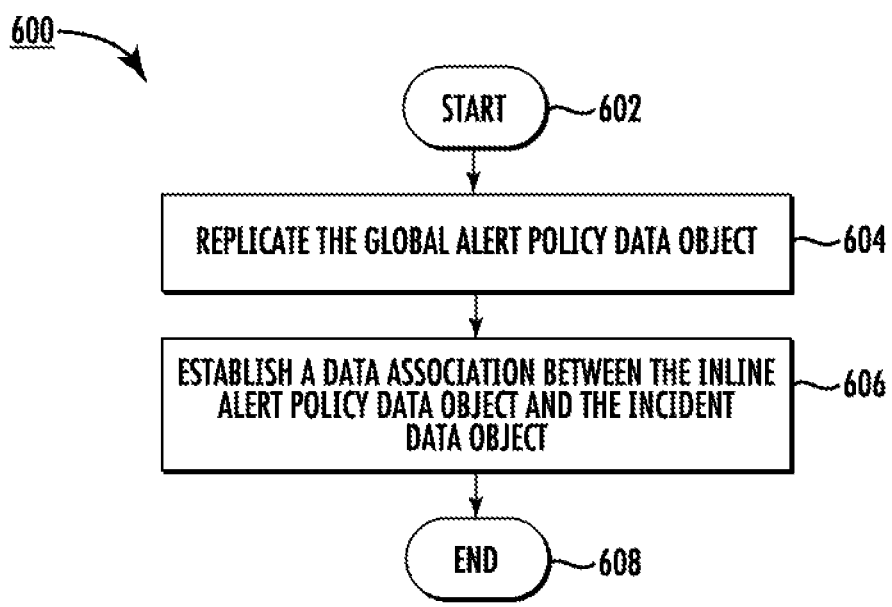
Figure 7:
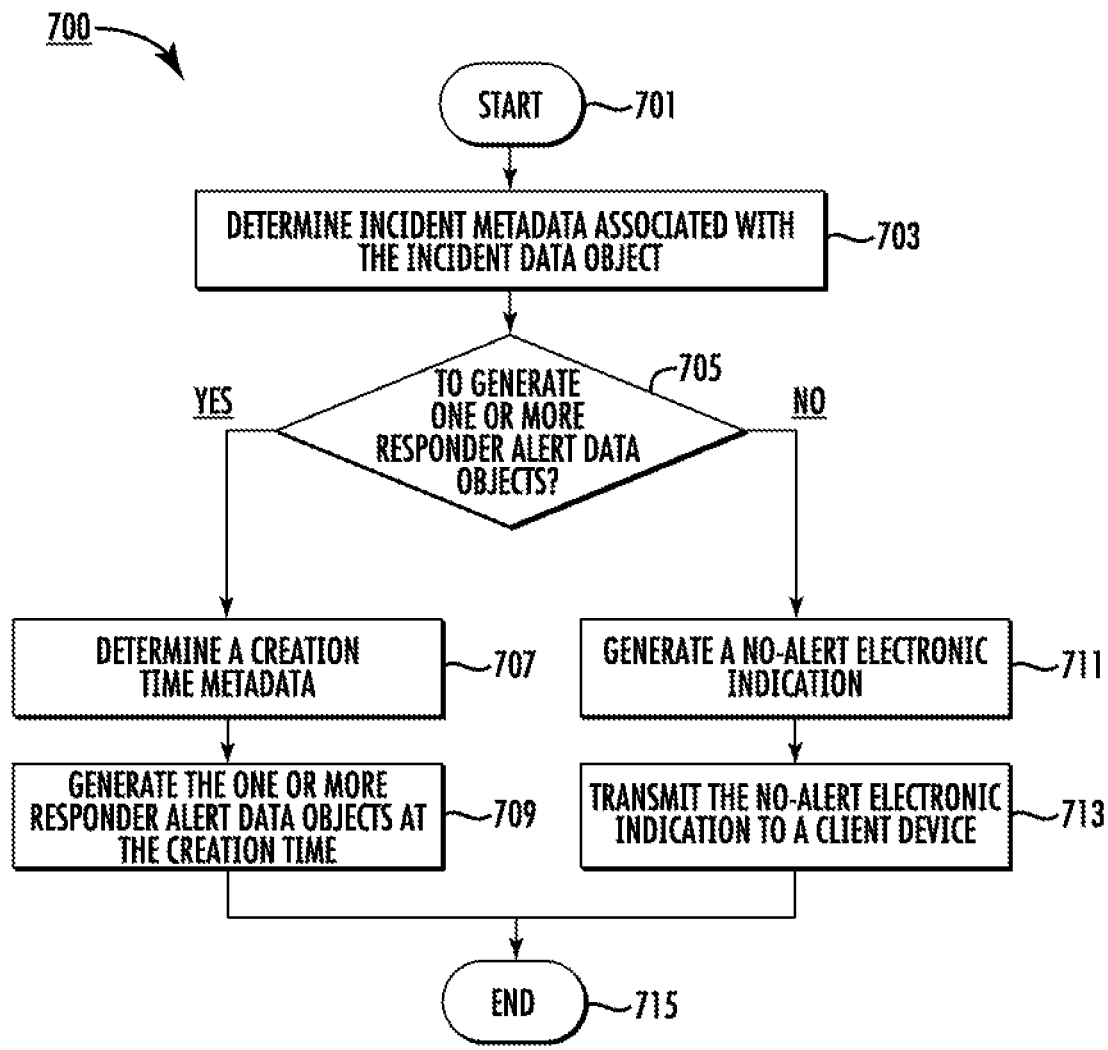
Figure 8:
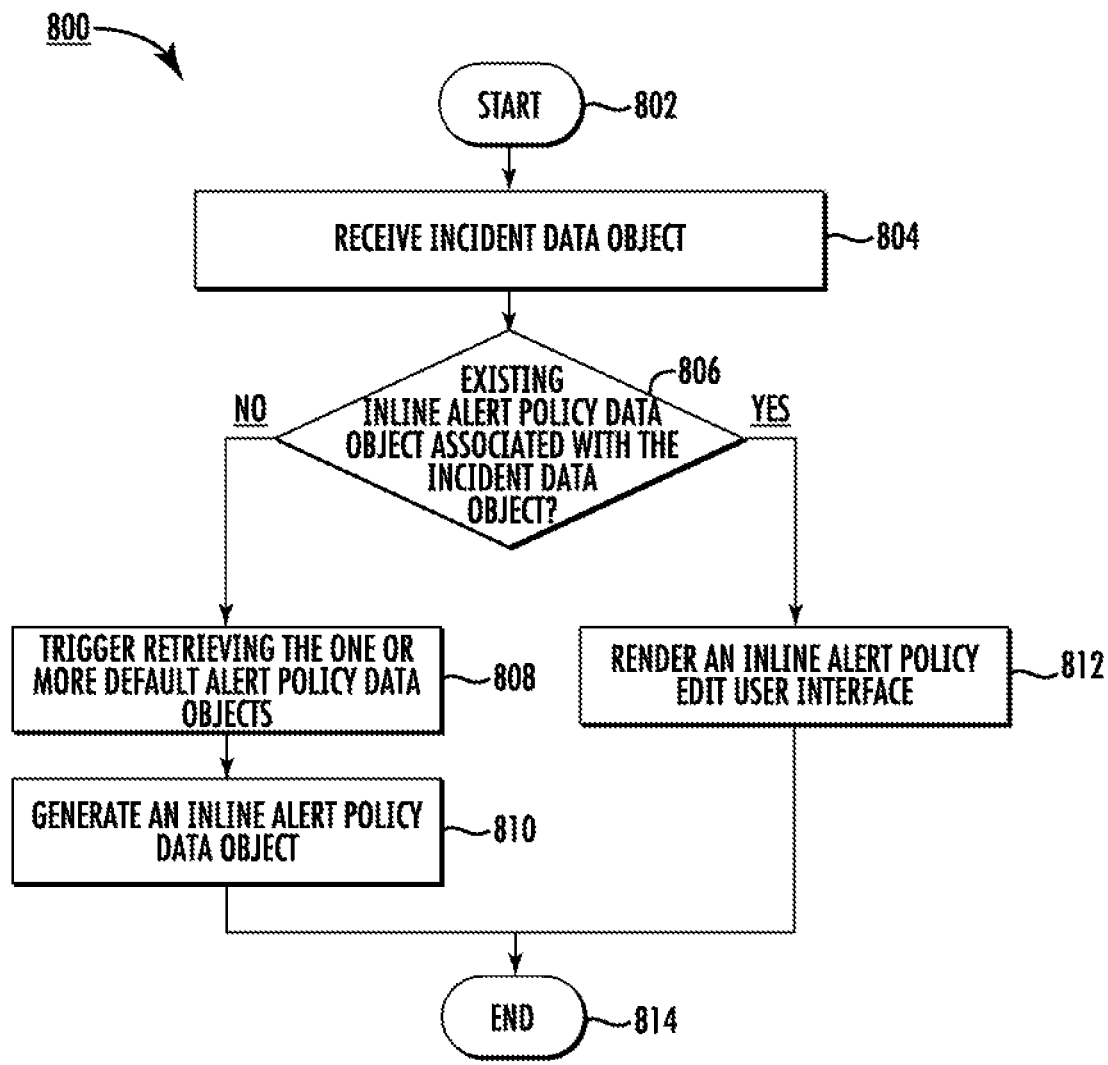
Figure 9:
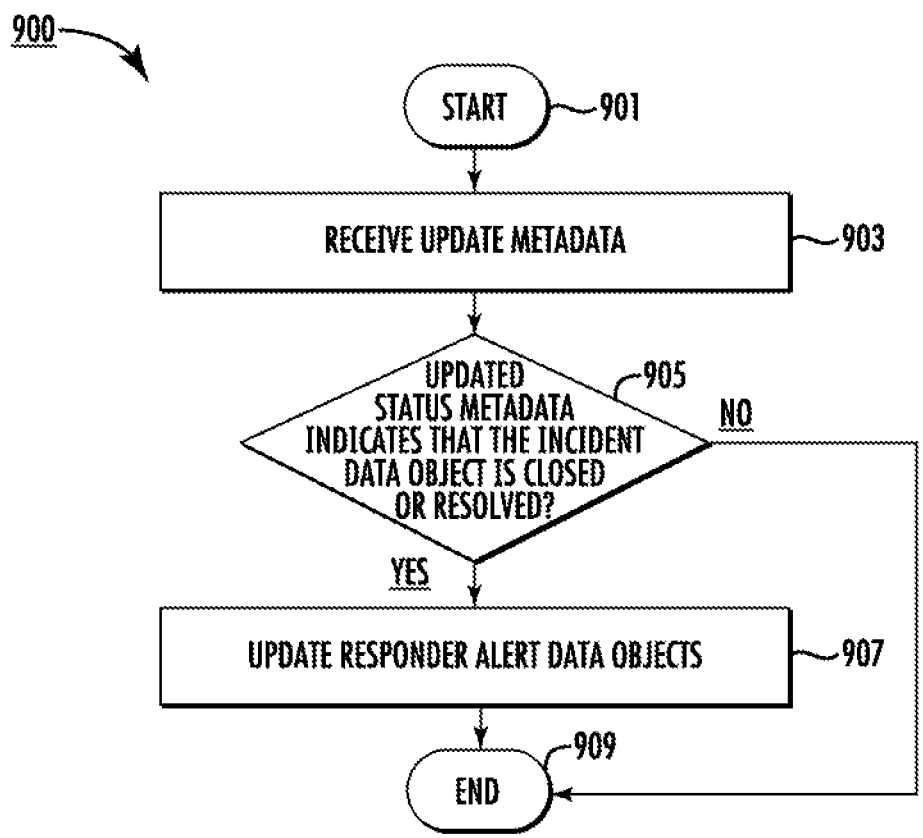
Figure 10:
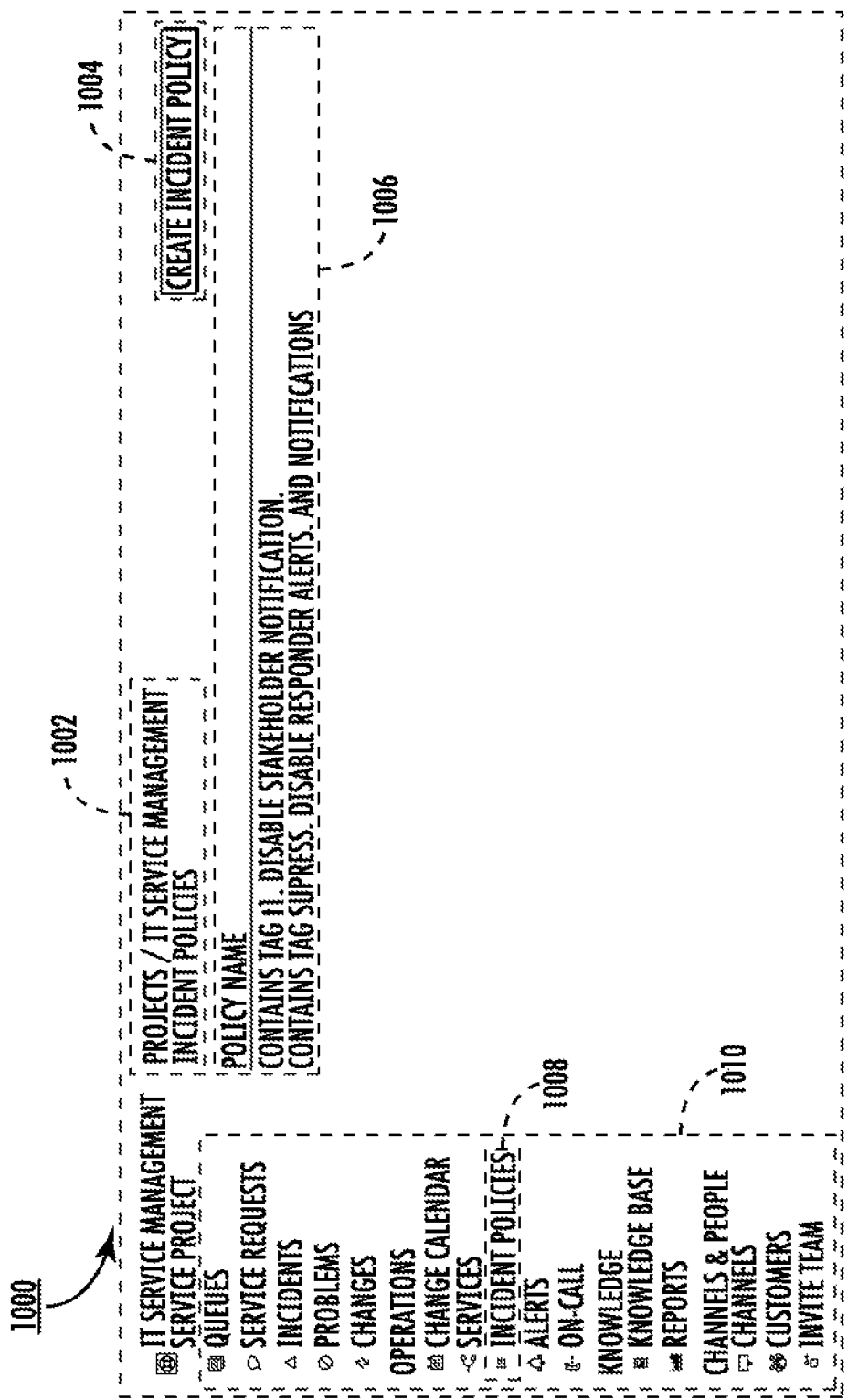
Figure 11:
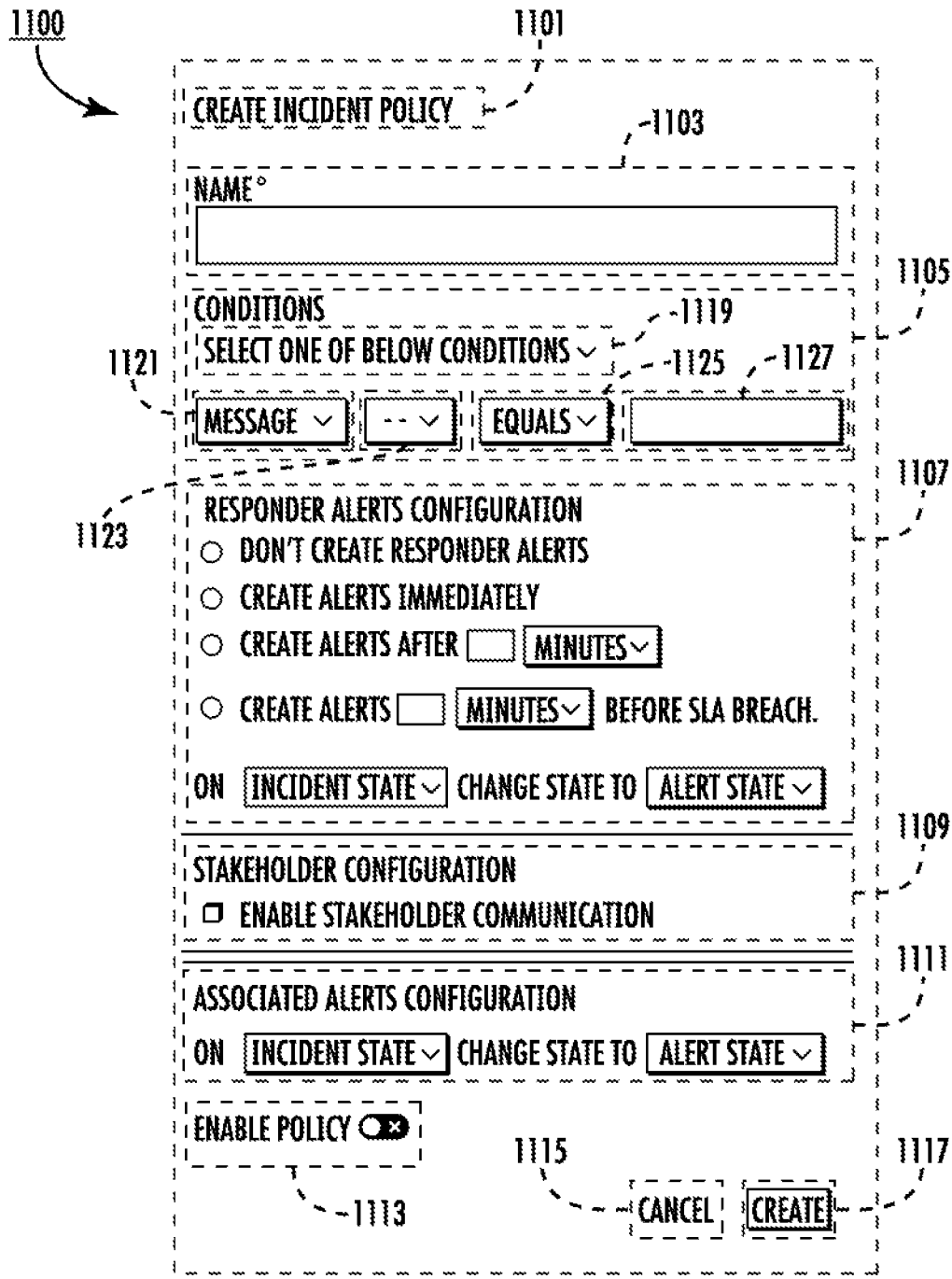
Figure 12:
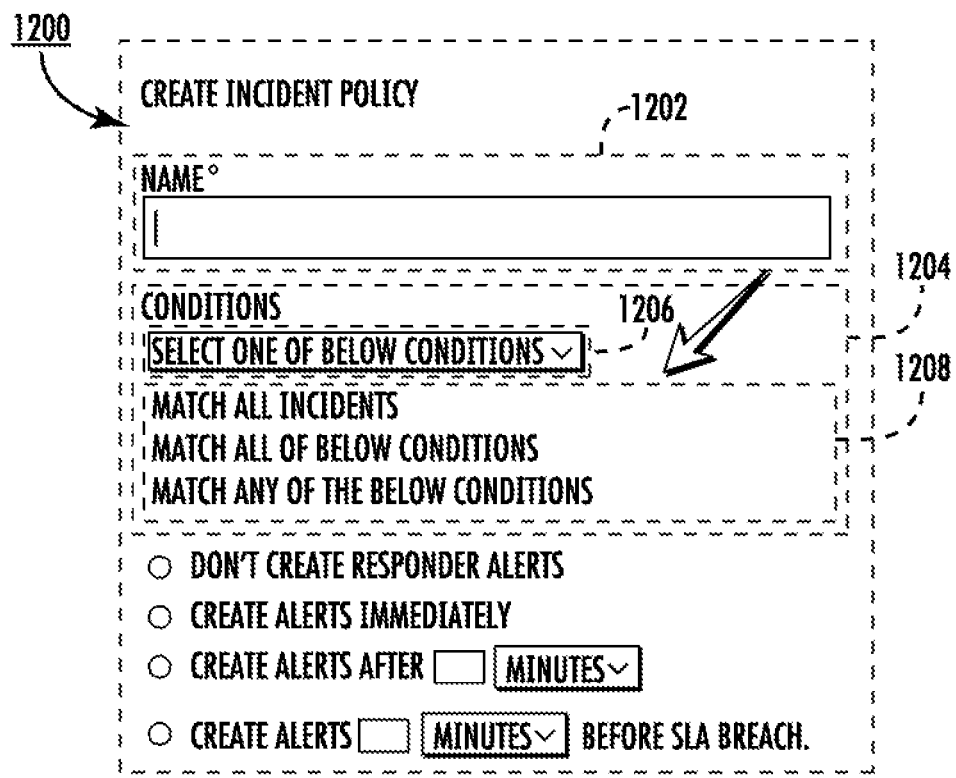
Figure 13:
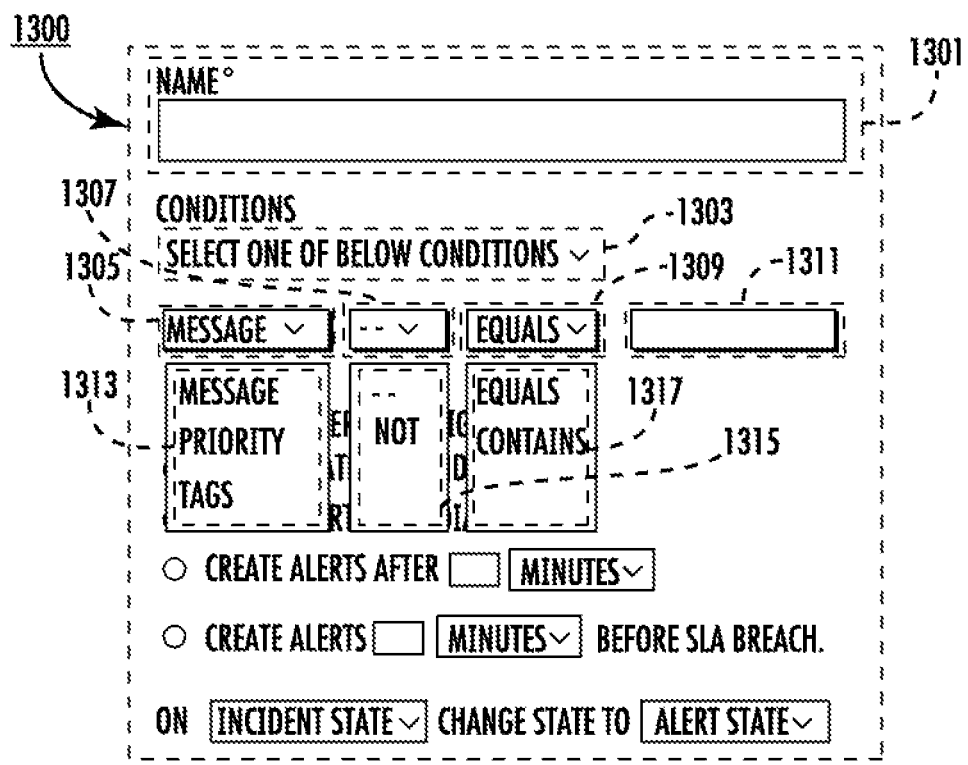
Figure 14:
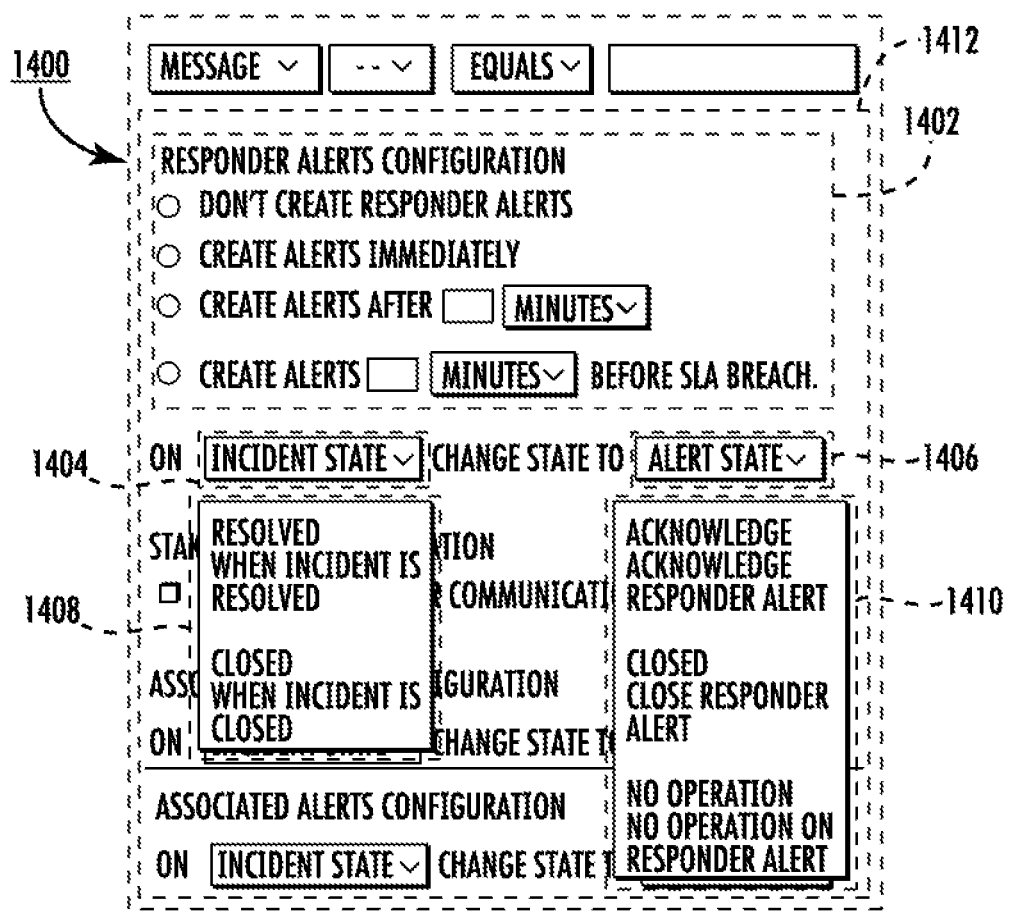
Figure 15:
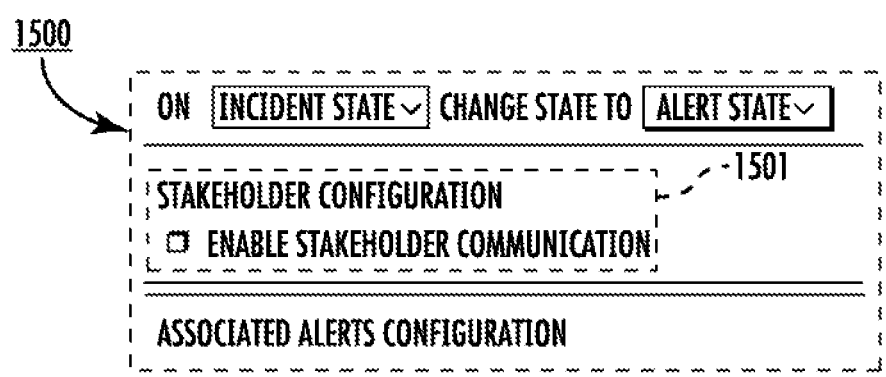
Figure 16:
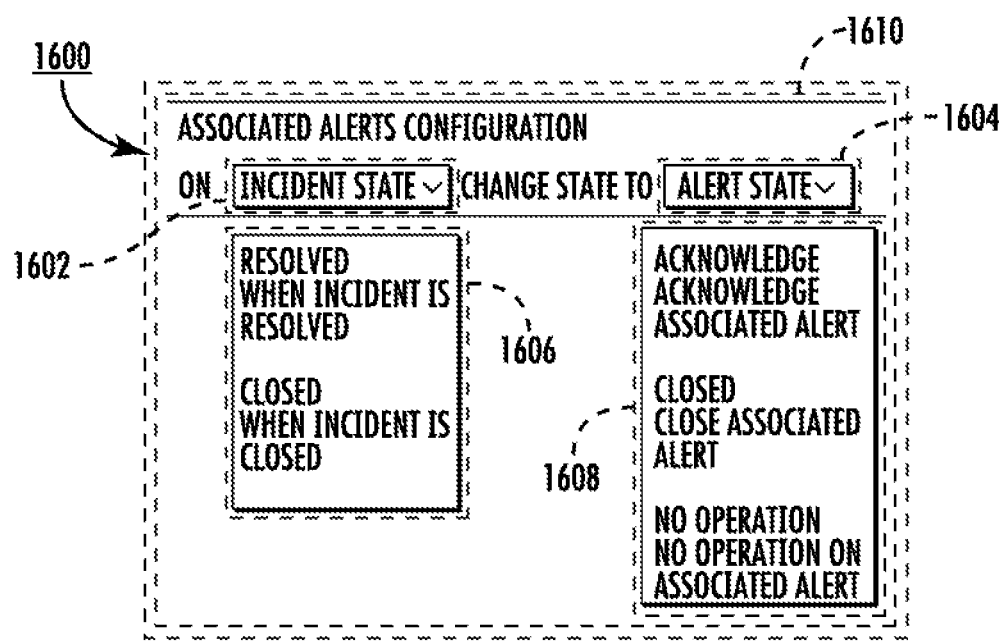
Figure 17:
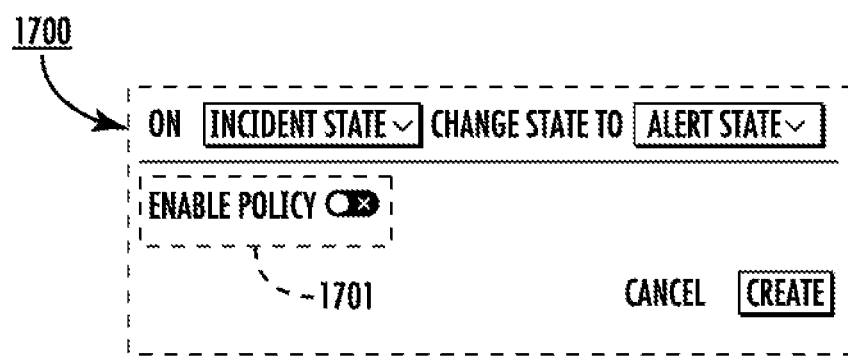
Figure 18:
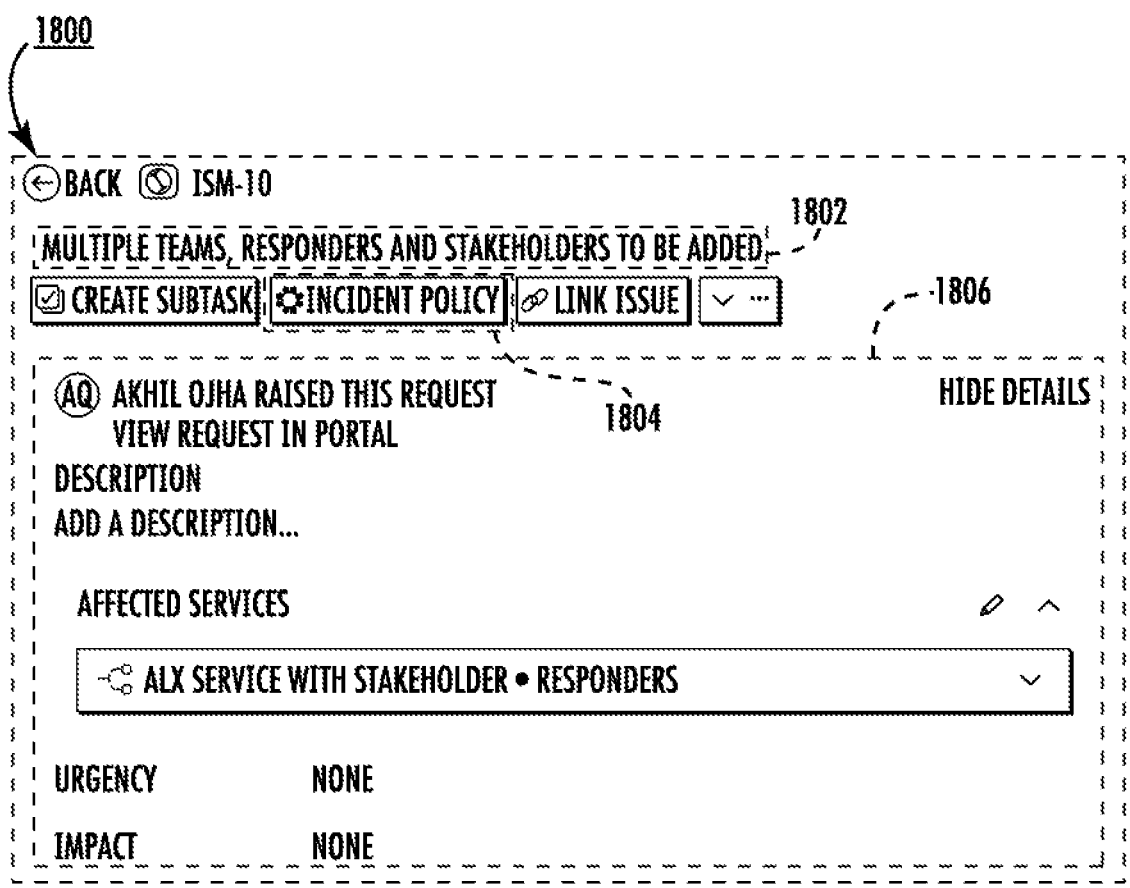
Figure 19:
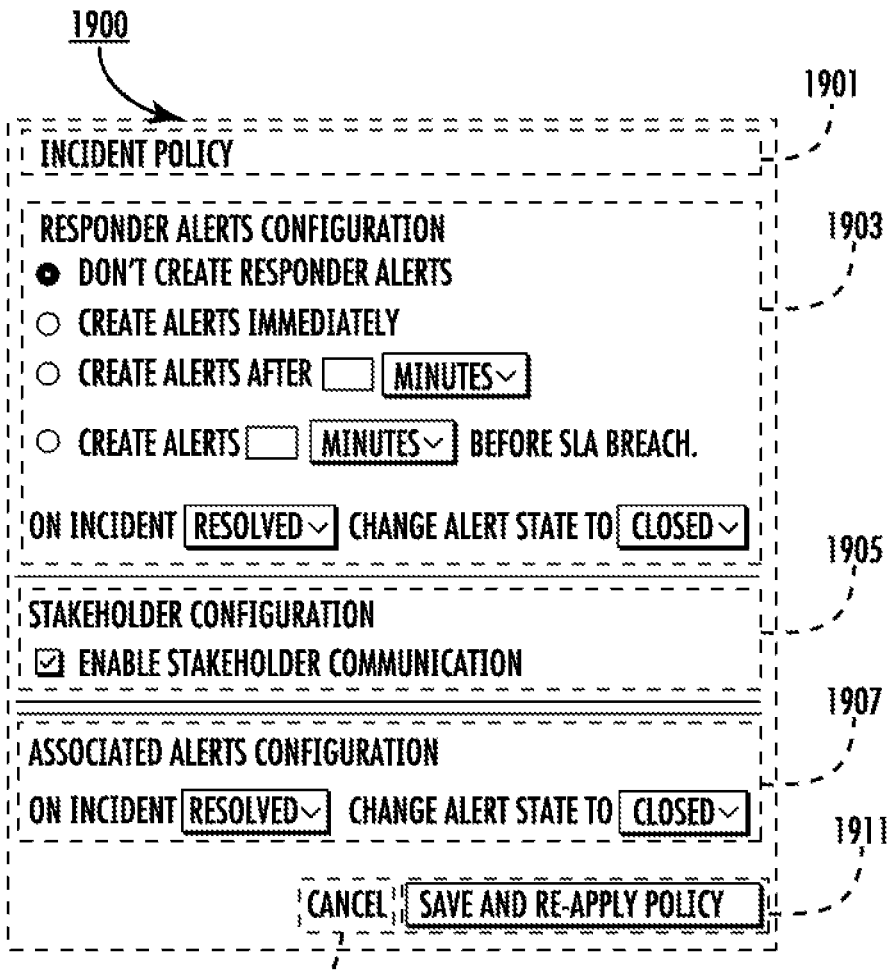

Having thus described some embodiments in general terms, references will now be made to the accompanying drawings, which are not necessarily drawn to scale, and wherein:

FIG. 1A is an example system architecture diagram illustrating an example incident alert and management platform in communication with other devices (such as client devices) in accordance with some embodiments of the present disclosure;

FIG. 1B is an example data flow diagram illustrating an example incident alert and management server in communication with other devices (such as client devices and data repositories) in accordance with some embodiments of the present disclosure;

FIG. 2 is an example infrastructure diagram illustrating an example computing device (for example, an example incident alert and management server) in accordance with some embodiments of the present disclosure;

FIG. 3 is an example infrastructure diagram illustrating an example computing device (for example, an example client device) in accordance with some embodiments of the present disclosure;

FIG. 4 is an example flowchart illustrating an example method of generating one or more responder alert data objects in accordance with some embodiments of the present disclosure;

FIG. 5 is an example flowchart illustrating an example method of generating and storing one or more global alert policy data objects in accordance with some embodiments of the present disclosure;

FIG. 6 is an example flowchart illustrating an example method of establishing data associations between inline alert policy data objects and incident data objects in accordance with some embodiments of the present disclosure;

FIG. 7 is an example flowchart illustrating an example method of determining whether to generate one or more responder alert data objects in accordance with some embodiments of the present disclosure;

FIG. 8 is an example flowchart illustrating an example method of determining one or more responder alert data objects in accordance with some embodiments of the present disclosure;

FIG. 9 is an example flowchart illustrating an example method of updating one or more responder alert data objects in accordance with some embodiments of the present disclosure;

FIG. 10 illustrates an example global alert policy creation user interface in accordance with some embodiments of the present disclosure;

FIG. 11 illustrates an example global alert policy creation pane of an example global alert policy creation user interface in accordance with some embodiments of the present disclosure;

FIG. 12 illustrates example user interface elements of an example global alert policy creation pane (including an example global alert policy data object name section and an example condition metadata configuration section) in accordance with some embodiments of the present disclosure;

FIG. 13 illustrates example user interface elements of an example global alert policy creation pane (including an example global alert policy data object name section and an example condition metadata configuration section) in accordance with some embodiments of the present disclosure;

FIG. 14 illustrates example user interface elements of an example global alert policy creation pane (including an example alert metadata configuration section) in accordance with some embodiments of the present disclosure;

FIG. 15 illustrates example user interface elements of an example global alert policy creation pane (including an example stakeholder configuration section) in accordance with some embodiments of the present disclosure;

FIG. 16 illustrates example user interface elements of an example global alert policy creation pane (including an example associated alert configuration section) in accordance with some embodiments of the present disclosure;

FIG. 17 illustrates example user interface elements of an example global alert policy creation pane (including an example global alert policy data object toggle) in accordance with some embodiments of the present disclosure;

FIG. 18 illustrates an example incident data object user interface in accordance with some embodiments of the present disclosure;

FIG. 19 illustrates an example inline alert policy edit pane of an example inline alert policy edit user interface in accordance with some embodiments of the present disclosure; and FIG. 20 illustrates an example incident data object creation user interface in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to dynamically configuring alerts based on incidents that are detected in a computing network environment (including, but not limited to, via an incident alert and management platform). For example, various embodiments of the present disclosure may generate one or more responder alert data objects based at least in part on a global alert policy data object and/or an inline alert policy data object.

In a computing network environment, computing resources are interconnected with one another to handle one or more computing tasks and fulfil one or more computing requirements such as, but not limited to, receiving data, calculating data, storing data, transmitting data, and/or the like. In some examples, one or more computing resources in an example computing network environment may be in hardware forms such as, but not limited to, one or more central processing units (CPUs), one or more memory units (such as, but not limited to, random-access memories, hard disk drives), one or more servers, one or more relays, one or more routers, and/or the like. In some examples, one or more computing resources in an example computing network environment may be in software forms, such as, but not limited to, one or more embedded software (such as, but not limited to, firmware), one or more web applications (such as, but not limited to, one or more application software that run on a server), and/or the like. In some embodiments, one or more computing resources in an example computing network environment may be in the form of one or more communication networks. In some embodiments, one or more computing resources in an example computing network environment may be in other forms.

As the complexity of computing tasks/requirements grows, more and more computing resources may be added to a computing network environment to complete these computing tasks and/or fulfill these computing requirements. For example, a computing network environment may comprise a massive collection of various computing resources, such as, but not limited to, one or more interconnected computing devices (e.g. desktop computers, laptop computers, smart phones, tablets, servers, and/or the like) and/or one or more software applications installed on these computing devices (such as, but not limited to, operating system (OS) software, custom software applications, services, and/or the like).

The ever-growing nature of the computing network environment creates various technical challenges and difficulties. For example, as more and more computing resources are added to the computing network environment, the performance reliability of the computing network environment may be affected. The term "performance reliability" refers to a network metric that measures the ability of the computing network environment to carry out its desired functions (such as completing computing tasks and/or fulfilling computing requirements).

As an example, an organization may implement a computing network environment to perform various tasks, operations, communications, and/or collaborations between and among various users within the organization. For example, an example computing network environment implemented by an organization may comprise computing resources in hardware forms (such as, but not limited to, desktop computers, laptop computers, workstations, and/or the like), may comprise computing resources in software forms (such as, but not limited to, one or more business software applications, one or more communications software applications, remote data access tools, and/or the like that are deployed on the desktop computers, laptop computers, workstations, and/or the like), and may comprise computing resources in other forms (such as, but not limited to, network routers, relays, and/or the like). Performance reliability is an operational imperative as operations of an organization may be dependent upon a reliable computing network environment.

However, incidents may inevitably occur, may affect performance reliability of computing network systems, and may cause system downtimes. Continuing from the organization example above, a business software application (such as, but not limited to, a payment software application) that has been implemented by the organization may encounter runtime errors due to, for example but not limited to, errors in the software design. As another example, a router within the computing network system may malfunction due to, for example but not limited to, misconfigurations in the router settings. As another example, a laptop of a user of the organization may cease to function due to, for example but not limited to, computer virus.

Minimizing the downtime of a computing network system caused by incidents can be critical to the survival of an organization. For example, when an incident occurs, it is of vital importance to identify the problem(s), alert the right group(s) or person(s) within or outside the organization who can handle, resolve, and/or address the incident, facilitate communications across group(s) or person(s), and collaborate to resolve problems in a timely manner. However, many systems and methods fail to overcome these technical challenges associated with responding to incidents in a computing network system.

For example, some systems and methods may create an alert or notification for each incident occurring within the computing network system, resulting in an overwhelming number of alerts and notifications. As such, incidents that require action are often misdirected to the wrong people/group or being ignored by the people/group that should handle such incidents.

As another example, some systems and methods lack the flexibility in generating alerts that suit the specific needs of specific organizations. For example, for the same type of incident that occurs within a network computing system (for example, a laptop computer of a user ceased to function), different organizations may handle such type of incident with different priorities and/or in different manners. As an example, there may not be a need to create an alert for a particular type of incident in some organizations (for example, no need in some organizations to create an alert when a user's laptop computer ceased to function), while there may be a need to create an alert for the same type of incident in other organizations (for example, a need in other organizations to create an alert when a user's laptop computer ceased to function).

As another example, some systems and methods fail to take into account the dynamic nature of incidents when generating alerts. For example, when data objects representing an incident that has been resolved or closed are copied or reopened, there may not be a need to generate any alert for the incident that has been resolved or closed. The status of data objects that represent incidents may be dynamically changed, and the need to generate an alert may change accordingly based on the status of these data objects.

In contrast, various embodiments of the present disclosure overcome at least the above-referenced technical challenges, and provide various technical improvements in computer-related technologies.

For example, various examples of the present disclosure may enable an organization to define one or more global alert policy data objects that specify organization-based and/or project-based policies of generating alerts in response to incidents within the computing network system based on, for example but not limited to, incident types. Additionally, or alternatively, various examples of the present disclosure may enable an organization to define one or more inline alert policy data objects that specify policies of generating alerts for specific incidents, and the one or more inline alert policy data objects may deviate from the global alerts policy data objects. Additionally, or alternatively, various examples of the present disclosure may provide user interfaces that enable organizations to easily create global alert policy data objects and/or to edit inline alert policy data objects. As such, various embodiments of the present disclosure provide flexibility to organizations in controlling the generation of alerts and/or to fine-tune these alerts based on the specific need of the organization and/or the project, thereby reducing unwanted and unnecessary alerts, as well as reducing the latency of the network computer system in processing various data requests.

As another example, various examples of the present disclosure may dynamically update one or more alerts based on the status of the corresponding incident. For example, an example system in accordance with embodiments of the present disclosure may determine whether an incident data object is a duplicated copy of another incident data object that is associated with a resolved or closed incident, and if so, may forgo generating an alert. Additionally, or alternatively, an example system in accordance with embodiments of the present disclosure may update one or more alerts generated based on the status of the corresponding incident.

As such, various embodiments of the present disclosure provide various technical improvements and overcome various technical challenges, details of which are described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the terms "set" or "subset" refer to a collection of zero or more elements.

In the present disclosure, the term "incident alert and management platform" refers to a software application platform and/or associated hardware that provides functionalities to manage incidents and generate alerts for these incidents. As described above, such incidents may occur within a computing network system of an organization. In the present disclosure, the term "organization" refers to an organized set of computing resources (including, but not limited to, hardware, software, networks, and/or the like)

that are associated with a user, a group of users, an enterprise, a company, and/or the like.

In the present disclosure, the term "organization identifier" refers to an identifier that uniquely identifies an organization from other organizations associated with the incident alert and management platform. For example, various organizations (such as Advent corporation, Beta corporation) may have access to the incident alert and management platform to manage incidents in their respective computing network systems, and the incident alert and management platform may assign an identifier for each organization. In some embodiments, the organization identifier may be in the form of text string(s), numerical character(s), alphabetical character(s), alphanumeric code(s), American Standard Code for Information Interchange (ASCII) character(s), and/or the like.

As described above, an example organization may be associated with one or more users. In the present disclosure, the term "user identifier" refers to an identifier that uniquely identifies a user from other users associated within an organization or across multiple different organizations. In some embodiments, the user identifier may be in the form of text string(s), numerical character(s), alphabetical character(s), alphanumeric code(s), ASCII character(s), and/or the like.

In some embodiments, incidents that are managed by an incident alert and management platform may be associated with one or more projects and/or one or more issues associated with a computing network system.

In the present disclosure, the term "issue" refers to an individual piece of a task associated with the computing network system that must be completed. For example, an example issue may represent and/or comprise data and/or information such as, but not limited to, a to-do item, a software application bug that needs to be fixed, among many other possibilities. In the present disclosure, the term "issue identifier" refers to an identifier that uniquely indicates, identifies or flags an issue within a computing network system. In some embodiments, the issue identifier may be in the form of text string(s), numerical character(s), alphabetical character(s), alphanumeric code(s), ASCII character(s), and/or the like.

In the present disclosure, the term "project" refers to an organized set of issues. For example, an example project may represent and/or comprise data and/or information such as, but not limited to, a software application, a virtual IT help-desk, among many other possibilities. In the present disclosure, the term "project identifier" refers to an identifier that uniquely indicates, identifies or flags a project within a computing network system. In some embodiments, the project identifier may be in the form of text string(s), numerical character(s), alphabetical character(s), alphanumeric code(s), ASCII character(s), and/or the like.

In the present disclosure, the term "data object" refers to a data structure that represents data, information, functionalities and/or characteristics associated with data and/or information. An example data object may comprise or be associated with a plurality of metadata. In the present disclosure, the term "metadata" refers to a parameter, a data field, a data element, or the like that describes an attribute of a data object.

For example, the term "incident data object" refers to a type of data object that comprises, represents, and/or is associated with data and/or information associated with an incident in a computing network system of an organization. In some embodiments, the term "incident" refers to a performance issue associated with a computing network system. Examples of incidents in a computing network system may include, but is not limited to, network service interruptions, service downtimes, computer malfunctions, and/or the like. In some embodiments, an incident alert and management platform may generate one or more incident data objects based on one or more detected incidents within the computing network system, details of which are described herein.

In some embodiments, an example incident data object may be associated with an organization identifier, a project identifier, and/or an issue identifier. For example, the example incident data object may be associated with an organization identifier, indicating that the incident represented by the incident data object is associated with the organization represented by the organization identifier. Additionally, or alternatively, the example incident data object may be associated with a project identifier, indicating that the incident represented by the incident data object is associated with the project represented by the project identifier. Additionally, or alternatively, the example incident data object may be associated with an issue identifier, indicating that the incident represented by the incident data object is associated with the issue represented by the issue identifier. In some embodiments, an example incident data object may be associated with one or more of an organization identifier, a project identifier, and/or an issue identifier.

In some embodiments, an example incident data object may comprise or be associated with metadata. Examples of metadata associated with an example incident data object may include, but not limited to, incident metadata, status metadata, update metadata, and/or the like.

In the present disclosure, the term "incident metadata" refers to a type of metadata associated with an incident data object that defines one or more types, one or more categories, one or more tags, one or more priorities, one or more messages, one or more characteristics, and/or one or more attributes of an incident data object. For example, the incident metadata may specify a type or category of the incident that the incident data object represents, such as, but not limited to, hardware issue, software issue, service issue, network issue, and/or the like. Additionally, or alternatively, the incident metadata may define characteristics and/or attributes of the incident that the incident data object represents, such as, but not limited to, the network location of the incident, the severity of the incident, the priority of the incident, and/or the like. In some embodiments, the incident metadata may be in the form of text string(s), numerical character(s), alphabetical character(s), alphanumeric code(s), ASCII character(s), and/or the like.

In the present disclosure, the term "status metadata" refers to a type of metadata associated with an incident data object that defines a status of an incident data object. For example, the status metadata may specify the status of the incident that the incident data object represents. In some embodiments, the status metadata may be in the form of text string(s), numerical character(s), alphabetical character(s), alphanumeric code(s), ASCII character(s), and/or the like.

As an example, the status metadata may specify an open status, which indicates that the incident represented by the incident data object is unsolved. As another example, the status metadata may specify a resolved status, which indicates that the incident represented by the incident data object has been resolved and/or is inactive. As another example, the status metadata may specify a closed status, which indicates that the incident represented by the incident data object has been closed and/or is no longer present in the computing network system.

In some examples, an incident data object associated with status metadata indicating a resolved status can be reopened. For example, when a responder resolved the incident corresponding to the incident data object, the status metadata of the incident data object may be changed to "resolved" and the incident data object become inactive. If the incident reoccurs, the status metadata of the incident data object be reverted from "resolved" back to "open," and one or more responder alert data objects may be generated in accordance with various examples of the present disclosure.

In some examples, an incident data object associated with status metadata indicating a closed status can be reopened. For example, if system administrator(s) of a computing network system determines that the incident associated with the incident data object has been addressed, the system administrator(s) may change the status metadata of the incident data object to a closed status. The status metadata of the incident data object cannot be reverted from a "closed" status back to an "open" status. Should the incident reoccur, a new incident data object can be generated.

In the present disclosure, the term "update metadata" refers to a type of metadata associated with an incident data object that defines one or more updates associated with the incident data object. For example, the update metadata may provide one or more changes to the incident metadata and/or the status metadata associated with the incident data object. In some embodiments, the update metadata may be in the form of text string(s), numerical character(s), alphabetical character(s), alphanumeric code(s), ASCII character(s), and/or the like.

In the present disclosure, the term "responder alert data object" refers to a type of data object that defines, comprises, and/or represents one or more alerts associated with an incident data object. For example, an example responder alert data object may define, comprise, and/or represent one or more push notifications, electronic mails, text messages, and/or other types of alerts associated with the incident data object and to be transmitted to a client device associated with a responder. In the present disclosure, the term "responder" refers to a user or a group of users associated with the organization (either within or outside of the organization) that is capable or responsible for responding to or handling an incident represented by an incident data object.

Examples of responder may include, but is not limited to, system administrator(s) of the computing network system of the organization, information technology (IT) support personnel of the organization, human resource personnel of the organization, management personnel of the organization, and/or the like.

In some embodiments, an example responder alert data object may comprise or be associated with metadata such as, but not limited to, creation time metadata, responder identifier metadata, alert time metadata, and/or the like.

In the present disclosure, the term "creation time metadata" refers to a type of metadata associated with a responder alert data object that represents or dictates a creation time associated with the responder alert data object. In the present disclosure, the term "creation time" refers to a time code or a timestamp indicating when a data object is generated or is scheduled to be generated. In some embodiments, the creation time metadata may be in the form of text string(s), numerical character(s), alphabetical character(s), alphanumeric code(s), ASCII character(s), and/or the like In the present disclosure, the term "responder identifier metadata" refers to a type of metadata associated with a responder alert data object that represents an identifier associated with the responder for the incident data object. In some embodiments, the responder identifier metadata may be in the form of text string(s), numerical character(s), alphabetical character(s), alphanumeric code(s), ASCII character(s), and/or the like. In some embodiments, an example responder identifier metadata may indicate or correspond to a user identifier that identifies the responder as a user within the organization.

In the present disclosure, the term "alert time metadata" refers to a type of metadata associated with a responder alert data object that represents an alert time associated with the responder alert data object. In the present disclosure, the term "alert time" refers to a time code or a timestamp indicating when an alert (such as, but not limited to, a push notification, an electronic mail, a text message, and/or the like) is scheduled to the transmitted to a client device associated with the responder or scheduled to be triggered to alert the responder. In some embodiments, the alert time metadata may be in the form of text string(s), numerical character(s), alphabetical character(s), alphanumeric code(s), ASCII character(s), and/or the like.

In the present disclosure, the term "alert policy data object" refers to a type of data object that represents, defines, and/or is associated with generating one or more responder alert data objects in response to one or more incident data objects. For example, an example alert policy data object may provide scheme(s), plan(s), and/or setting(s) of generating responder alert data objects based on the one or more incident data objects. In some embodiments, an example alert policy metadata may be associated with metadata such as, but not limited to, condition metadata, alert metadata, and/or the like.

In the present disclosure, the term "condition metadata" refers to a type of metadata associated with an alert policy data object that represents, defines, and/or comprises one or more conditions for generating responder alert data objects. For example, an example condition metadata associated with an example alert policy data object may specify one or more types, one or more categories, one or more tags, one or more priorities, one or more messages, one or more characteristics, and/or one or more attributes associated with an incident data object that would trigger generating one or more responder alert data object, details of which are described herein. In some embodiments, the condition metadata may be in the form of text string(s), numerical character(s), alphabetical character(s), alphanumeric code(s), ASCII character(s), and/or the like.

In the present disclosure, the term "alert metadata" refers to a type of metadata associated with an alert policy data object that specifies and/or defines whether to generate one or more responder alert data objects and/or specifies and/or defines one or more metadata associated with one or more responder alert data objects, such as, but not limited to, one or more creation times associated with the one or more responder alert data objects, one or more responder identifiers associated with the one or more responder alert data objects, one or more alert times associated with the responder alert data objects, and/or the like. For example, an example alert metadata associated with an example alert policy data object may specify whether to generate one or more responder alert data objects, and if so, may further specify one or more creation times associated with the one or more responder alert data objects, details of which are described herein. In some embodiments, the alert metadata may be in the form of text string(s), numerical character(s), alphabetical character(s), alphanumeric code(s), ASCII character(s), and/or the like.

In the present disclosure, an example alert policy data object can be categorized based on its type. Example types of alert policy data objects include, but not limited to, global alert policy data objects, inline alert policy data objects, default alert policy data objects, and/or the like.

In the present disclosure, the term "global alert policy data object" refers to a type of alert policy data object that represents, defines, and/or is associated with generating one or more responder alert data objects based on one or more corresponding characteristics of the incident data objects, such as, but not limited to, a type or category associated with the incident data object, a priority associated with the incident data object, a tags associated with the incident data object, and/or the like. For example, an example global alert policy data object may define the characteristics of the incident data objects that would trigger generating one or more responder alert data objects (e.g. generating responder alert data objects when the characteristics of the incident data objects meet a certain condition). Additionally, or alternatively, an example global alert policy data object may define metadata associated with one or more responder alert data objects (such as, but not limited to, creation time metadata, responder identifier metadata, and/or alert time metadata described above).

In some examples, an example global alert policy data object is associated with an organization identifier, a project identifier, and/or an issue identifier. For example, the example global alert policy data object defines, represents, defines, and/or is associated with generating one or more responder alert data objects based on incident data objects associated with the organization identifier. Additionally, or alternatively, the example global alert policy data object defines, represents, defines, and/or is associated with generating one or more responder alert data objects based on incident data objects associated with the project identifier. Additionally, or alternatively, the example global alert policy data object defines, represents, defines, and/or is associated with generating one or more responder alert data objects based on incident data objects associated with the issue identifier.

For example, the example global alert policy data object is associated with the organization identifier of Advent corporation. In such an example, the example global alert policy data object defines, represents, defines, and/or is associated with generating one or more responder alert data objects based on incident data objects associated with Advent corporation, and may not define, represents, defines, and/or is associated with generating one or more responder alert data objects for other organizations (such as Beta corporation). Additional details associated with global alert policy data objects are described herein.

Additionally, or alternatively, the example global alert policy data object is associated with the project identifier of a software deployment project (for example, associated with deploying software to computers of users in the Advent corporation). In such an example, the example global alert policy data object defines, represents, defines, and/or is associated with generating one or more responder alert data objects based on incident data objects associated with the software deployment project, and may not define, represents, defines, and/or is associated with generating one or more responder alert data objects for other projects (such as other projects associated with the Advent corporation).

In some embodiments, an example global alert policy data object may be associated with one or more of an organization identifier, a project identifier, and/or an issue identifier.

In the present disclosure, the term "inline alert policy data object" refers to a type of alert policy data object that is generated for and associated with one specific incident data object. In some embodiments, an inline alert policy data object is a local alert policy data object that is attached to or associated with the one specific incident data object.

For example, in comparison with an example global alert policy data object that can be applicable to one or more incident data objects based on their corresponding incident metadata (details of which are described herein), an example inline alert policy data object may be generated only for one particular incident data object and be applicable to only the one particular incident data object. In some embodiments, changes of an example global alert policy data object may result in changes in generating responder alert data objects for multiple incident data objects that correspond to the example global alert policy data object. In contrast, changes of an example inline alert policy data object may result in changes in generating responder alert data objects for the one specific incident data object that the example inline alert policy data object is associated with. In some embodiments, a global alert policy data object is re-usable for different incident data objects that satisfy the conditions as set forth by the condition metadata of the global alert policy data object. In some embodiments, an inline alert policy data object is not re-usable for other incident data objects, and "lives and dies" along with the corresponding incident data object that the inline alert policy data object is associated with.

In some embodiments, an inline alert policy data object may be a duplicated, local copy of a global alert policy data object that corresponds to or matches an incident data object, details of which are described herein. Additionally, or alternatively, an inline alert policy data object may not be based on any global alert policy data object, details of which are described herein.

In the present disclosure, the term "default alert policy data object" refers to a type of alert policy data object that represents, defines, and/or provides provide default scheme(s), default plan(s), and/or default setting(s) of generating responder alert data objects. In some embodiments, a default alert policy data object may be associated with default settings of generating responder alert data objects in the incident alert and management platform. In some examples, an example default alert policy data object is associated with an organization identifier, a project identifier, and/or an issue identifier. For example, the example default alert policy data object represents, defines, and/or provides provide default scheme(s), default plan(s), and/or default setting(s) of generating one or more responder alert data objects based on incident data objects associated with the organization identifier. Additionally, or alternatively, the example default alert policy data object represents, defines, and/or provides provide default scheme(s), default plan(s), and/or default setting(s) of generating one or more responder alert data objects based on incident data objects associated with the project identifier. Additionally, or alternatively, the example default alert policy data object represents, defines, and/or provides provide default scheme(s), default plan(s), and/or default setting(s) of generating one or more responder alert data objects based on incident data objects associated with the issue identifier.

In the present disclosure, the term "data repository" refers to one or more network storage locations (and/or one or more network data storage devices) where one or more data objects are electronically stored. For example, the term "global alert policy data repository" refers to a type of data repository where global alert policy data objects are electronically stored. The term "inline alert policy data repository" refers to a type of data repository where inline alert policy data objects are electronically stored.

In the present disclosure, the term "user interface" refers to a space where human-computer interaction and communication may occur. For example, a user interface may be rendered on a display associated with a computing device.

For example, the term "global alert policy creation user interface" refers to a type of user interface that may facilitate creating one or more global alert policy data objects. For example, a user may provide global alert policy creation metadata via the global alert policy creation user interface.

In the present disclosure, the term "global alert policy creation metadata" refers to a type of metadata that defines metadata associated with a global alert policy data object. For example, example global alert policy creation metadata may comprise one or more alert metadata associated with a global alert policy data object, such as, but not limited to, one or more creation times associated with the one or more responder alert data objects, one or more responder identifiers associated with the one or more responder alert data objects, one or more alert times associated with the responder alert data objects, and/or the like. Additionally, or alternatively, example global alert policy creation metadata may comprise one or more condition metadata associated with a global alert policy data object, such as, but not limited to, one or more types, one or more categories, one or more tags, one or more priorities, one or more messages, one or more characteristics, and/or one or more attributes associated with an incident data object that would trigger generating one or more responder alert data object.

In some embodiments, the global alert policy creation metadata is associated with an organization identifier, which indicates that the global alert policy data object(s) to be created based on the global alert policy creation metadata is associated with the organization identifier. Additionally, or alternatively, the global alert policy creation metadata is associated with a project identifier, which indicates that the global alert policy data object(s) to be created based on the global alert policy creation metadata is associated with the project identifier. Additionally, or alternatively, the global alert policy creation metadata is associated with an issue identifier, which indicates that the global alert policy data object(s) to be created based on the global alert policy creation metadata is associated with the issue identifier.

As another example, the term "global alert policy edit user interface" refers to a type of user interface that may facilitate editing one or more global alert policy data objects. For example, a user may provide global alert policy edit metadata via the global alert policy edit user interface.

In the present disclosure, the term "global alert policy edit metadata" refers to a type of metadata that provides one or more updated or revised metadata associated with a global alert policy data object. For example, example global alert policy edit metadata may comprise one or more updated or revised alert metadata associated with a global alert policy data object, such as, but not limited to, one or more updated or revised creation time associated with the one or more responder alert data objects, one or more updated or revised responder identifiers associated with the one or more responder alert data objects, one or more updated or revised alert time associated with the responder alert data objects, and/or the like. Additionally, or alternatively, example global alert policy edit metadata may comprise one or more updated or revised condition metadata associated with a global alert policy data object, such as, but not limited to, one or more updated or revised types, one or more updated or revised categories, one or more updated or revised tags, one or more updated or revised priorities, one or more updated or revised messages, one or more updated or revised characteristics, and/or one or more updated or revised attributes associated with an incident data object that would trigger generating one or more responder alert data object.

In some embodiments, the global alert policy edit metadata is associated with an organization identifier, which indicates that the global alert policy data object(s) to be updated and/or revised based on the global alert policy edit metadata is associated with the organization identifier. Additionally, or alternatively, the global alert policy edit metadata is associated with a project identifier, which indicates that the global alert policy data object(s) to be updated and/or revised based on the global alert policy edit metadata is associated with the project identifier. Additionally, or alternatively, the global alert policy edit metadata is associated with an issue identifier, which indicates that the global alert policy data object(s) to be updated and/or revised based on the global alert policy edit metadata is associated with the issue identifier.

As another example, the term "inline alert policy creation user interface" refers to a type of user interface that may facilitate creating one or more inline alert policy data objects. For example, a user may provide inline alert policy creation metadata via the inline alert policy creation user interface.

In the present disclosure, the term "inline alert policy creation metadata" refers to a type of metadata that defines metadata associated with an inline alert policy data object. For example, example inline alert policy creation metadata may comprise one or more alert metadata associated with an inline alert policy data object, such as, but not limited to, one or more creation times associated with the one or more responder alert data objects, one or more responder identifiers associated with the one or more responder alert data objects, one or more alert times associated with the responder alert data objects, and/or the like. In some embodiments, the inline alert policy creation metadata is associated with an organization identifier, which indicates that the inline alert policy data object(s) to be created based on the inline alert policy creation metadata is associated with the organization identifier. Additionally, or alternatively, the inline alert policy creation metadata is associated with a project identifier, which indicates that the inline alert policy data object(s) to be created based on the inline alert policy creation metadata is associated with the project identifier. Additionally, or alternatively, the inline alert policy creation metadata is associated with an issue identifier, which indicates that the inline alert policy data object(s) to be created based on the inline alert policy creation metadata is associated with the issue identifier.

As another example, the term "inline alert policy edit user interface" refers to a type of user interface that may facilitate editing one or more inline alert policy data objects. For example, a user may provide inline alert policy edit metadata via the inline alert policy edit user interface.

In the present disclosure, the term "inline alert policy edit metadata" refers to a type of metadata that provides one or more updated or revised metadata associated with an inline alert policy data object. For example, example inline alert policy edit metadata may comprise one or more updated or revised alert metadata associated with an inline alert policy data object, such as, but not limited to, one or more updated or revised creation time associated with the one or more responder alert data objects, one or more updated or revised responder identifiers associated with the one or more responder alert data objects, one or more updated or revised alert time associated with the responder alert data objects, and/or the like. In some embodiments, the inline alert policy edit metadata is associated with an organization identifier, which indicates that the inline alert policy data object(s) to be updated and/or revised based on the inline alert policy edit metadata is associated with the organization identifier. Additionally, or alternatively, the inline alert policy edit metadata is associated with a project identifier, which indicates that the inline alert policy data object(s) to be updated and/or revised based on the inline alert policy edit metadata is associated with the project identifier. Additionally, or alternatively, the inline alert policy edit metadata is associated with an issue identifier, which indicates that the inline alert policy data object(s) to be updated and/or revised based on the inline alert policy edit metadata is associated with the issue identifier.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an incident alert and management server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1A illustrates an example incident alert and management environment 100 within which embodiments of the present disclosure may operate. In the example shown in FIG. 1A, the incident alert and management environment 100 may comprise an incident alert and management platform 105 in electronic communication with one or more client devices 101A, 101B, . . . 101N (for example, via a communication network). In some embodiments, users may access the incident alert and management platform 105 via the communication network using client devices 101A, 101B, . . . 101N.

In some embodiments, the client devices 101A-101N may be a computing device as described herein, including, but not limited to, desktop computers, laptop computers, smartphones, netbooks, tablet computers, wearables, and the like. In some embodiments, the client devices 101A-101N may interact with the incident alert and management platform 105 via a web browser or through a web application that runs in a web browser. As yet another example, the client devices 101A-101N may include various hardware or firmware designed to interface with the incident alert and management platform 105.

In some embodiments, the communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network may include an 802.11, 802.16, 802.20, and/or WiMax network. Further, the communication network may include a public network (such as the Internet), a private network (such as an intranet), or combinations thereof, and may utilize a variety of networking protocols including, but not limited to, TCP/IP based networking protocols. For instance, the networking protocol may be customized to suit the needs of the incident alert and management server 107 and/or the client devices 101A-101N. In some embodiments, the protocol is a custom protocol of JSON objects sent via a WebSocket channel. In some embodiments, the protocol is JSON over RPC, JSON over REST/HTTP, and the like.

In various embodiments of the present disclosure, electronic data received by the incident alert and management platform 105 from the client devices 101A-101N may be provided in various forms and via various methods. For example, data and information (such as but not limited to, data objects) may be sent to the incident alert and management platform 105 via, for example, the communication network directly by a client device of client devices 101A-101N. Additionally, or alternatively, these data and information (such as but not limited to, data objects) may be sent to incident alert and management platform 105 via one or more intermediaries.

In some embodiments, some of the client devices 101A, 101B, 101C, . . . , 101N may be associated with an organization that is different from the organization associated with other client devices. For example, the client devices 101A, . . . , 101B are associated with a first organization 113A, and the client devices 101C, . . . , 101N are associated with a second organization 113B, as shown in FIG. 1A. In some embodiments, each of the client devices 101A, 101B, 101C, . . . , 101N is associated with a corresponding organization identifier. For example, the client device 101A and the client device 101B are associated with an organization identifier that corresponds to the organization 113A. Additionally, or alternatively, the client device 101C and the client device 101N are associated with an organization identifier that corresponds to the organization 113B.

In some embodiments, the incident alert and management platform 105 comprises one or more data repositories. In the examples shown in FIG. 1A, the incident alert and management platform 105 comprises a global alert policy data repository 103A, an inline alert policy data repository 103B, and an incident data object repository 103C. In some embodiments, the global alert policy data repository 103A may store one or more global alert policy data objects. In some embodiments, the inline alert policy data repository 103B may store one or more inline alert policy data objects. In some embodiments, the incident data object repository 103C may store one or more incident data objects.

In some embodiments, the incident alert and management platform 105 comprises one or more servers (such as, but not limited to, the incident alert and management server 107 in the example shown in FIG. 1A). In some embodiments, the incident alert and management server 107 is in electronic communication with one or more computing devices outside of the incident alert and management platform 105 (such as, but not limited to, one or more of the client devices 101A, 101B, . . . 101N). In some embodiments, the incident alert and management server 107 is in electronic communication with one or more computing devices within the incident alert and management platform 105 (such as, but not limited to, the global alert policy data repository 103A, the inline alert policy data repository 103B, and the incident data object repository 103C). Additional details associated with the electronic communications between the incident alert and management server 107 and other computing devices are described herein.

It is noted that various components of the incident alert and management environment 100 may leverage the same computer or computing apparatus to perform various operations. For example, various components of one or more servers (such as, but not limited to, the incident alert and management server 107 in the example shown in FIG. 1A) and one or more data object repositories (such as, but not limited to, the global alert policy data repository 103A, the inline alert policy data repository 103B, and the incident data object repository 103C in the example shown in FIG. 1A) in the incident alert and management platform 105 may leverage the same computer or computing apparatus to perform various operations.

Referring now to FIG. 1B, an example data flow diagram in accordance with various embodiments of the present disclosure are illustrated, In particular, the example diagrams illustrates example electronic communications between the incident alert and management server 107, the global alert policy data repository 103A, the inline alert policy data repository 103B.

In the example shown in FIG. 1B, the incident alert and management server 107 is represented as comprising various software modules that have been installed on the hardware components of the incident alert and management server 107. For example, the incident alert and management server 107 may comprise a policy registry controller module 112, a policy registry service module 115, an incident controller module 119, a create action executor module 121, a policy matcher module 125, an incident policy updater module 127, a policy evaluator module 133, and an incident update processor module 139.

In some embodiments, a client device (such as the client devices 101A, 101B, . . . 101N described above in connection with at least FIG. 1A) may transmit an alert policy creation request 111 to the incident alert and management server 107, which indicates an electronic request to generate one or more alert policy data objects (for example, a global alert policy data object). In this example, the policy registry controller module 112 of the incident alert and management server 107 receives the alert policy creation request 111, and may communicate with the policy registry service module 115. In particular, the policy registry service module 115 may create, update, delete alert policy data objects (such as, but not limited to, those stored in the global alert policy data repository 103A as shown in FIG. 1B). In some embodiments, each of the global alert policy data objects stored in the global alert policy data repository 103A that are associated with an organization identifier may be evaluated.

In some embodiments, a client device (such as the client devices 101A, 101B, . . . 101N described above in connection with at least FIG. 1A) may transmit an incident data object creation request 117 to the incident alert and management server 107, which indicates an electronic request to generate one or more incident data objects. The incident controller module 119 of the incident alert and management server 107 may receive the incident data object creation request 117, and communicate with the create action executor module 121 to generate one or more incident data objects based on the incident data object creation request 117. In some embodiments, the create action executor module 121 may determine whether the incident data objects are associated with an existing inline alert policy data object at step/operation 123.

If there is no existing inline alert policy data object associated with the incident data objects as determined at step/operation 123, the create action executor module 121 communicates with the policy matcher module 125, which in turn communicates with the policy registry service module 115 to retrieve one or more global alert policy data objects from the global alert policy data repository 103A, details of which are described herein. In some embodiments, a global alert policy data object retrieved from the global alert policy data repository 103A may correspond to or match the incident data object, and the policy matcher module 125 may generate an inline alert policy data object based on the global alert policy data object and stores the inline alert policy data object in the inline alert policy data repository 103B, details of which are described herein.

If there is an existing inline alert policy data object associated with the incident data objects as determined at step/operation 123, the create action executor module 121 proceeds to step/operation 129 to create responder alert data objects based on the inline alert policy data object, details of which are described herein. Additionally, or alternatively, the create action executor module 121 may communicate with the incident policy service module 135, which in turn communicates with the inline alert policy data repository 103B and stores the inline alert policy data object in the inline alert policy data repository 103B. In some embodiments, the incident policy service module 135 may establish a data association between the incident data object and the inline alert policy data object, details of which are described herein.

In some embodiments, the policy evaluator module 133 may determine whether to generate one or more responder alert data objects based on the inline alert policy data object and/or the global alert policy data object. For example, the policy evaluator module 133 may determine whether and when to generate the responder alert data objects based on metadata associated with the inline alert policy data object and/or the global alert policy data object, details of which are described herein. Additionally, or alternatively, the policy evaluator module 133 may determine how to update the responder alert data objects once the corresponding incident is resolved/closed.

In some embodiments, the incident controller module 119 may receive the inline alert policy data object from the incident policy service module 135, and may transmit the inline alert policy data object to a client device. For example, a rendering of the inline alert policy data object may be displayed on a display of the client device along with an inline alert policy edit user interface, and a user may provide inline alert policy edit metadata via the inline alert policy edit user interface. The inline alert policy edit metadata may be received by the incident policy updater module 127. Based on the inline alert policy edit metadata, the incident policy updater module 127 may update the corresponding inline alert policy data object stored in the inline alert policy data repository 103B (for example, via the incident policy service module 135), and may retrigger the notification flow 131. In particular, once the corresponding inline alert policy data object has been updated, the responders associated with the responder alert data objects defined by the corresponding inline alert policy data object are notified of the update.

In some embodiments, a client device (such as the client devices 101A, 101B, . . . 101N described above in connection with at least FIG. 1A) may transmit an incident data object update request 137 to the incident alert and management server 107, which indicates an electronic request to update one or more incident data objects. For example, the incident data object update request 137 may comprise update metadata as described herein. In the example shown in FIG. 1B, the incident update processor module 139 may receive the incident data object update request 137. The incident update processor module 139 may retrieve the corresponding inline alert policy data object associated with the incident data object.

In some embodiments, if the incident data object update request 137 indicates that the status of the incident data object has been updated to a "resolved" status, the incident update processor module 139 triggers the incident resolve action applier workflow 141 to update the corresponding inline alert policy data object. In some embodiments, the incident resolve action applier workflow 141 is defined or specified based on user input. For example, a user, operating a client device, may provide global alert policy creation metadata via a global alert policy creation user interface that defines or specified changes to a responder alert data object when the status metadata of the corresponding incident data object is changed to a "resolved" status, details of which are described herein.

In some embodiments, if the incident data object update request 137 indicates that the status of the incident data object has been updated to a "closed" status, the incident update processor module 139 triggers the incident close action applier workflow 143 to update the corresponding inline alert policy data object. In some embodiments, the incident close action applier workflow 143 is defined or specified based on user input. For example, a user, operating a client device, may provide global alert policy creation metadata via a global alert policy creation user interface that defines or specified changes to a responder alert data object when the status metadata of the corresponding incident data object is changed to a "closed" status, details of which are described herein.

In some embodiments, each of the incident resolve action applier workflow 141 and the incident close action applier workflow 143 may involve the policy evaluator module 133 to retrigger the notification flow 131. In particular, once the corresponding inline alert policy data object has been updated, the responders associated with the responder alert data objects defined by the corresponding inline alert policy data object are notified of the update.

Example Apparatuses for Implementing Embodiments of the Present Disclosure

The client devices 101A, 101B, 101C, . . . , 101N of FIG. 1A may include one or more computing systems, such as the apparatus 200 shown in FIG. 2. The apparatus 200 may be configured to execute at least some of the operations described above with respect to FIG. 1A and below with respect to FIG. 4 to FIG. 9 and/or render at least some of the user interfaces described below with respect to FIG. 10 to FIG. 20. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The incident alert and management server 107 of FIG. 1A may be embodied by one or more computing systems, such as apparatus 300 shown in FIG. 3. The apparatus 300 may include a processor 305, a memory 301, an input/output circuitry 307, and a communications circuitry 303. The apparatus 300 may be configured to execute at least some of the operations described above with respect to FIG. 1A and below with respect to FIG. 4 to FIG. 9 and/or render at least some of the user interfaces described below with respect to FIG. 10 to FIG. 20. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or co-processor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multi-threading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1A). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 9, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4 to FIG. 9 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4, an example method 400 is illustrated. In particular, the example method 400 illustrates example steps/operations of generating one or more responder alert data objects in accordance with some embodiments of the present disclosure.

In the example shown in FIG. 4, the example method 400 starts at block 402 and then proceeds to step/operation 404. At step/operation 404, a processing circuitry (such as the processor 305 of the incident alert and management server 107 described above in connection with at least FIG. 1A and FIG. 3) receives an incident data object. In some embodiments, the incident data object is associated with an organization identifier.

As described above, an incident data object comprises, represents, and/or is associated with data and/or information associated with an incident in a computing network system of an organization. Examples of incidents in a computing network system may include, but is not limited to, network service interruptions, service downtimes, computer malfunctions, and/or the like.

In some embodiments, an incident alert and management platform may programmatically monitor and/or detect one or more incidents in a computing network system of an organization, and may generate one or more incident data objects based on the one or more incidents. For example, the incident alert and management platform may comprise one or more software modules installed on a computing device (such as on an incident alert and management server) that monitor and/or detect incidents in a computing network system of an organization.

In some embodiments, an incident alert and management platform may generate one or more incident data objects based on user inputs that describe one or more network incidents. For example, the incident alert and management platform may receive user inputs from one or more client devices (such as, but not limited to, client devices 101A, . . . , 101N described above in connection with at least FIG. 1A and FIG. 2) that comprise data and/or information describing one or more incidents, and the incident alert and management platform may generate one or more incident data objects based on the user inputs.

In some embodiments, the processing circuitry may receive an incident data object from another computing device within the incident alert and management platform (for example, another server). Additionally, or alternatively, the processing circuitry may receive an incident data object from a client device (for example, client devices 101A, . . . , 101N described above in connection with at least FIG. 1A and FIG. 2). In some embodiments, the processing circuitry may generate the incident data object based on programmatically detecting and/or monitoring incidents in a computing network system of an organization and/or based on receiving user inputs describing incidents in a computing network system of an organization.

As an example, the processing circuitry may receive an incident data object that comprises, represents, and/or is associated with data and/or information associated with an incident of payroll software service interruption, where a user of the organization Advent corporation cannot access a payroll software that is distributed within the computing network system of Advent corporation. In this example, the incident data object is associated with an organization identifier that indicates Advent corporation, which indicates that the incident data object represents and/or describes an incident associated with the Advent corporation.

Additionally, or alternatively, the incident data object may be associated with a project identifier, similar to those described above. Additionally, or alternatively, the incident data object may be associated with an issue identifier, similar to those described above.

Referring back to FIG. 4, subsequent to step/operation 404, the method 400 proceeds to step/operation 406. At step/operation 406, a processing circuitry (such as the processor 305 of the incident alert and management server 107 described above in connection with at least FIG. 1A and FIG. 3) retrieves one or more global alert policy data objects.

In some embodiments, the processing circuitry may retrieve one or more global alert policy data objects from a global alert policy data repository associated with an organization identifier in response to receiving the incident data object associated with the same organization identifier at step/operation 404.

For example, an incident alert and management platform may comprise one or more global alert policy data repositories (such as, but not limited to, global alert policy data repository 103A described above in connection with at least FIG. 1A and FIG. 1B), where one or more global alert policy data objects are stored. Each of the global alert policy data objects is associated with an organization identifier and represents, defines, and/or is associated with generating one or more responder alert data objects based on one or more corresponding characteristics of one or more incident data objects associated with the same organization identifier.

In some embodiments, the processing circuitry may retrieve the one or more global alert policy data objects based on querying the global alert policy data repository according to the organization identifier. Continuing from the payroll software service interruption example above, in response to receiving the incident data object indicating payroll software service interruption associated with the Advent corporation, the processing circuitry may query the global alert policy data repository and retrieve one or more global alert policy data objects associated with the organization identifier of the Advent corporation at step/operation 406.

Additionally, or alternatively, the processing circuitry may retrieve one or more global alert policy data objects from a global alert policy data repository associated with a project identifier in response to receiving the incident data object associated with the same project identifier. For example, an incident alert and management platform may comprise one or more global alert policy data repositories (such as, but not limited to, global alert policy data repository 103A described above in connection with at least FIG. 1A and FIG. 1B), where one or more global alert policy data objects are stored. Each of the global alert policy data objects is associated with a project identifier and represents, defines, and/or is associated with generating one or more responder alert data objects based on one or more corresponding characteristics of one or more incident data objects associated with the same project identifier.

Additionally, or alternatively, the processing circuitry may retrieve one or more global alert policy data objects from a global alert policy data repository associated with an issue identifier in response to receiving the incident data object associated with the same issue identifier. For example, an incident alert and management platform may comprise one or more global alert policy data repositories (such as, but not limited to, global alert policy data repository 103A described above in connection with at least FIG. 1A and FIG. 1B), where one or more global alert policy data objects are stored. Each of the global alert policy data objects is associated with an issue identifier and represents, defines, and/or is associated with generating one or more responder alert data objects based on one or more corresponding characteristics of one or more incident data objects associated with the same issue identifier.

Referring back to FIG. 4, subsequent to step/operation 406, the method 400 proceeds to step/operation 408. At step/operation 408, a processing circuitry (such as the processor 305 of the incident alert and management server 107 described above in connection with at least FIG. 1A and FIG. 3) determines whether a global alert policy data object corresponds to the incident data object.

In some embodiments, the processing circuitry determines whether a global alert policy data object of the one or more global alert policy data objects retrieved at step/operation 406 corresponds to the incident data object received at step/operation 404 based at least in part on incident metadata associated with the incident data object received at step/operation 404 and condition metadata associated with the one or more global alert policy data objects retrieved at step/operation 406.

As described above, the incident metadata of the incident data object received at step/operation 404 defines one or more types, one or more categories, one or more tags, one or more priorities, one or more messages, one or more characteristics, and/or one or more attributes of an incident data object. The condition metadata associated with the one or more global alert policy data object retrieved at step/operation 406 represents, defines, and/or comprises one or more conditions for generating responder alert data objects. At step/operation 408, the processing circuitry determines whether the one or more conditions associated with the global alert policy data objects correspond to or match the one or more types, one or more categories, one or more tags, one or more priorities, one or more messages, one or more characteristics, and/or one or more attributes of an incident data object.

As an example, an example global alert policy data object retrieved at step/operation 406 may define a priority of the incident data object as part of the condition metadata. The priority may indicate a seniority of an incident compared to other incidents. In such an example, if the priority of the incident metadata of the incident data object received at step/operation 404 matches the priority defined by the condition metadata of the global alert policy data object, the processing circuitry determines that the global alert policy data object corresponds to the incident data object.

Additionally, or alternatively, an example global alert policy data object retrieved at step/operation 406 may define a tag of the incident data object as part of the condition metadata. The tag may indicate a label or category associated with an incident. In such an example, if the tag of the incident metadata of the incident data object received at step/operation 404 matches the tag defined by the condition metadata of the global alert policy data object, the processing circuitry determines that the global alert policy data object corresponds to the incident data object.

Additionally, or alternatively, an example global alert policy data object retrieved at step/operation 406 may define a message of the incident data object as part of the condition metadata. The message may indicate a description or representation associated with an incident. In such an example, if the message of the incident metadata of the incident data object received at step/operation 404 matches the message defined by the condition metadata of the global alert policy data object, the processing circuitry determines that the global alert policy data object corresponds to the incident data object.

Continuing from the payroll software service interruption example above, the incident data object indicating payroll software service interruption associated with the Advent corporation may comprise incident metadata that defines one or more types, one or more categories, one or more tags, one or more priorities, one or more messages, one or more characteristics, and/or one or more attributes of the incident data object. The processing circuitry may determine whether the condition metadata associated with the one or more global alert policy data objects retrieved at step/operation 406 matches or corresponds to the incident metadata of the incident data object.

Referring back to FIG. 4, if, at step/operation 408, the processing circuitry determines that the global alert policy data object does not correspond to the incident data object, the method 400 returns to step/operation 406.

In some embodiments, the processing circuitry may continue querying the global alert policy data repository and retrieving one or more global alert policy data objects until a global alert policy data object of the one or more retrieved global alert policy data objects corresponds to the incident data object as described above.

Additionally, or alternatively, if the processing circuitry determines that the global alert policy data object does not correspond to the incident data object, the processing circuitry may trigger generating one or more inline alert policy data objects. As described above, an example inline alert policy data object refers to a type of alert policy data object that is generated for and associated with one specific incident data object. In some embodiments, in response to determining that the global alert policy data object does not correspond to the incident data object, the processing circuitry may trigger rendering an inline alert policy creation user interface on a client device associated with the organization identifier, may receive inline alert policy creation metadata from the client device, and may generate an example inline alert policy data object for the incident data object based on the inline alert policy creation metadata. In some embodiments, the inline alert policy data objects are generated based on default alert policy data objects. For example, the processing circuitry may generate a duplicated, local copy of a default alert policy data object as the inline alert policy data object.

Continuing from the payroll software service interruption example above, if the processing circuitry determines that the global alert policy data object retrieved at step/operation 408 does not correspond to the incident data object received at step/operation 404, the processing circuitry may return to step/operation 406. Additionally, or alternatively, if the processing circuitry determines that the global alert policy data object retrieved at step/operation 408 does not correspond to the incident data object received at step/operation 404, the processing circuitry may trigger rendering an inline alert policy creation user interface on a client device associated with the Advent corporation, may receive inline alert policy creation metadata from the client device, and may generate an example inline alert policy data object for the incident data object based on the inline alert policy creation metadata as described above.

Referring back to FIG. 4, if, at step/operation 408, the processing circuitry determines that the global alert policy data object corresponds to the incident data object. the method 400 proceeds to step/operation 410. At step/operation 410, a processing circuitry (such as the processor 305 of the incident alert and management server 107 described above in connection with at least FIG. 1A and FIG. 3) generates an inline alert policy data object.

In some embodiments, in response to determining that the global alert policy data object corresponds to the incident data object at step/operation 408, the processing circuitry generates an inline alert policy data object associated with the incident data object received at step/operation 404 and based at least in part on the global alert policy data object that corresponds to the incident data object.

For example, the processing circuitry may generate the inline alert policy data object by creating a duplicated copy of the global alert policy data object that corresponds to the incident data object as determined at step/operation 408. In such an example, the inline alert policy data object comprises metadata (such as alert metadata) that is the same as the metadata (such as alert metadata) of the global alert policy data object. In some embodiments, the processing circuitry may further associate the inline alert policy data object with the incident data object received at step/operation 404 (for example, by establishing a data association between the inline alert policy data object and the incident data object), details of which are described herein. As described above, the inline alert policy data object is a local alert policy data object that provides alert policies (e.g. according to alert metadata) associated with only the incident data object received at step/operation 404.

Continuing from the payroll software service interruption example above, subsequent to determining that the condition metadata associated with a global alert policy data object retrieved at step/operation 406 matches or corresponds to the incident metadata of the incident data object, the processing circuitry may generate an inline alert policy data object based at least in part on the global alert policy data object. For example, the processing circuitry may create a duplicated copy of the global alert policy data object as the inline alert policy data object at step/operation 410.

Referring back to FIG. 4, subsequent to step/operation 410, the method 400 proceeds to step/operation 412. At step/operation 412, a processing circuitry (such as the processor 305 of the incident alert and management server 107 described above in connection with at least FIG. 1A and FIG. 3) receives inline alert policy edit metadata.

In some embodiments, the processing circuitry receives inline alert policy edit metadata associated with alert metadata of the inline alert policy data object generated at step/operation 410 via an inline alert policy edit user interface rendered on a display of a client device associated with the organization identifier. In some embodiments, the inline alert policy edit user interface is associated with the inline alert policy data object. As described above, the inline alert policy data object refers to a type of data object that represents, defines, and/or is associated with generating one or more responder alert data objects. In some embodiments, the inline alert policy edit metadata may be associated with the one or more responder alert data objects.

For example, with reference to FIG. 1A, the processing circuitry may cause rendering of an inline alert policy edit user interface on a display of a client device 101A associated with an organization identifier that is the same as the organization identifier associated with the incident data object received at step/operation 404. In some embodiments, the inline alert policy edit user interface is associated with the inline alert policy data object generated at step/operation 410. For example, the inline alert policy edit user interface comprises a rendering of the inline alert policy data object generated at step/operation 410.

In some embodiments, a user may provide user inputs via the inline alert policy edit user interface rendered on the display of the client device 101A. The client device 101A may generate inline alert policy edit metadata based on the user inputs. Additionally, or alternatively, the client device 101A may transmit the user inputs to the processing circuitry, and the processing circuitry may generate the inline alert policy edit metadata based on the user inputs.

For example, the user may provide user inputs that indicate one or more updated or revised alert metadata associated with the inline alert policy data object generated at step/operation 410, such as, but not limited to, one or more updated or revised creation time associated with the one or more responder alert data objects, one or more updated or revised responder identifiers associated with the one or more responder alert data objects, one or more updated or revised alert time associated with the responder alert data objects, and/or the like.

Continuing from the payroll software service interruption example above, the inline alert policy data object generated at step/operation 410 may comprise alert metadata that specifies and/or defines one or more metadata associated with one or more responder alert data objects. The processing circuitry may render an inline alert policy edit user interface on a display of a client device associated with the Advent corporation, and a user may provide user inputs via the inline alert policy edit user interface. For example, the user inputs may comprise one or more updated or revised creation time associated with the one or more responder alert data objects for the incident data object associated with the payroll software service interruption, one or more updated or revised responder identifiers associated with the one or more responder alert data objects for the incident data object associated with the payroll software service interruption, one or more updated or revised alert time associated with the responder alert data objects for the incident data object associated with the payroll software service interruption, and/or the like.

Referring back to FIG. 4, subsequent to step/operation 412, the method 400 proceeds to step/operation 414. At step/operation 414, a processing circuitry (such as the processor 305 of the incident alert and management server 107 described above in connection with at least FIG. 1A and FIG. 3) generates one or more responder alert data objects.

In some embodiments, in response to receiving the inline alert policy edit metadata at step/operation 412, the processing circuitry generates one or more responder alert data objects associated with the incident data object received at step/operation 404 based at least in part on the inline alert policy data object generated at step/operation 410 and the inline alert policy edit metadata received at step/operation 412.

As described above, the inline alert policy edit metadata received at step/operation 412 may be associated with the one or more responder alert data objects as defined by the inline alert policy data object generated at step/operation 410. For example, the inline alert policy edit metadata may comprise one or more updated or revised creation time associated with the one or more responder alert data objects, one or more updated or revised responder identifiers associated with the one or more responder alert data objects, one or more updated or revised alert time associated with the responder alert data objects. At step/operation 414, the processing circuitry may update and/or revise the alert metadata associated with the inline alert policy data object based on the inline alert policy edit metadata, and may generate the one or more responder alert data objects.

In some embodiments, the one or more responder alert data objects define, comprise, and/or represent one or more alerts that are generated for and are associated with the incident data object received at step/operation 404. For example, the one or more responder alert data objects generated at step/operation 414 may define, comprise, and/or represent one or more push notifications, electronic mails, text messages, and/or other types of alerts associated with the incident data object received at step/operation 404 and to be transmitted to a client device associated with a responder within the organization.

Continuing from the payroll software service interruption example above, the processing circuitry may update and/or revise the alert metadata associated with the inline alert policy data object based on the inline alert policy edit metadata, and may generate the one or more responder alert data objects for the incident data object associated with the payroll software service interruption. For example, the one or more responder alert data objects may define, comprise, and/or represent one or more push notifications, electronic mails, text messages, and/or other types of alerts (associated with the incident data object corresponding to the payroll software service interruption) that are to be transmitted to a client device associated with a responder of the Advent corporation. Examples of responder may include, but is not limited to, system administrator(s) of the computing network system of Advent corporation, IT support personnel of Advent corporation, human resource personnel of Advent corporation, management personnel of Advent corporation, and/or the like.

Referring back to FIG. 4, subsequent to step/operation 414, the method 400 proceeds to step/operation 416 and ends.

Referring now to FIG. 5, an example method 500 is illustrated. In particular, the example method 500 illustrates example steps/operations of generating and storing one or more global alert policy data objects in accordance with some embodiments of the present disclosure.

In the example shown in FIG. 5, the example method 500 starts at block 501 and then proceeds to step/operation 503. At step/operation 503, a processing circuitry (such as the processor 305 of the incident alert and management server 107 described above in connection with at least FIG. 1A and FIG. 3) receives global alert policy creation metadata.

In some embodiments, the processing circuitry receives the global alert policy creation metadata via a global alert policy creation user interface rendered on the display of the client device. In some embodiments, the global alert policy creation metadata is associated with the organization identifier.

As described above, the global alert policy creation user interface refers to a type of user interface that may facilitate creating one or more global alert policy data objects. In some embodiments, the processing circuitry may cause rendering of the global alert policy creation user interface on the display of a client device associated with an organization identifier. For example, the global alert policy creation user interface may comprise a global alert policy creation pane, details of which are described herein.

In some embodiments, a user from the organization may provide user inputs via the global alert policy creation user interface (for example, via the global alert policy creation pane). In some embodiments, only users associated with one or more particular use roles within the organization may be authorized to access the global alert policy creation user interface. Examples of such user roles may include, but is not limited to, system administrator(s) of the computing network system of the organization, IT support personnel of the organization, human resource personnel of the organization, management personnel of the organization, and/or the like.

For example, the global alert policy creation user interface may enable a user to specific or define various metadata associated with a global alert policy data object, such as, but not limited to, a global alert policy data object name, condition metadata associated with the global alert policy data object, alert metadata associated with the global alert policy data object, stakeholder alerts associated with the global alert policy data object, associated alerts associated with the global alert policy data object, and/or the like, details of which are described herein.

In some embodiments, the client device may generate global alert policy creation metadata based on the user inputs. Additionally, or alternatively, the client device may transmit the user inputs to the processing circuitry, and the processing circuitry may generate the global alert policy creation metadata based on the user inputs.

In some embodiments, the global alert policy creation metadata received at step/operation 503 may comprise one or more alert metadata associated with a global alert policy data object that is related to the organization identifier. For example, the global alert policy creation metadata may comprise one or more creation times associated with the one or more responder alert data objects that are related to the organization identifier, one or more responder identifiers associated with the one or more responder alert data objects that are related to the organization identifier, one or more alert times associated with the responder alert data objects that are related to the organization identifier, and/or the like. Additionally, or alternatively, example global alert policy creation metadata may comprise one or more condition metadata associated with a global alert policy data object that is related to the organization identifier, such as, but not limited to, one or more types, one or more categories, one or more tags, one or more priorities, one or more messages, one or more characteristics, and/or one or more attributes associated with an incident data object of the organization identifier that would trigger generating one or more responder alert data object.

In some embodiments, the global alert policy creation metadata received at step/operation 503 may comprise one or more alert metadata associated with a global alert policy data object that is related to a project identifier, similar to those described above. In some embodiments, the global alert policy creation metadata received at step/operation 503 may comprise one or more alert metadata associated with a global alert policy data object that is related to an issue identifier, similar to those described above.

Referring back to FIG. 5, subsequent to step/operation 503, the method 500 proceeds to step/operation 505. At step/operation 505, a processing circuitry (such as the processor 305 of the incident alert and management server 107 described above in connection with at least FIG. 1A and FIG. 3) generates one or more global alert policy data objects.

In some embodiments, the processing circuitry generates the one or more global alert policy data objects based at least in part on the global alert policy creation metadata. In some embodiments, the global alert policy creation metadata defines at least one condition metadata and at least one alert metadata associated with the organization identifier.

For example, the global alert policy creation metadata received at step/operation 503 may comprise one or more alert metadata associated with a global alert policy data object, such as, but not limited to, one or more creation times associated with the one or more responder alert data objects that are related to the organization identifier, one or more responder identifiers associated with the one or more responder alert data objects that are related to the organization identifier, one or more alert times associated with the responder alert data objects that are related to the organization identifier, and/or the like. In such an example, the processing circuitry may generate the alert metadata of the global alert policy data object that corresponds to the alert metadata as described by the global alert policy creation metadata.

Additionally, or alternatively, the global alert policy creation metadata received at step/operation 503 may comprise one or more condition metadata associated with a global alert policy data object that is related to the organization identifier, such as, but not limited to, one or more types, one or more categories, one or more tags, one or more priorities, one or more messages, one or more characteristics, and/or one or more attributes associated with an incident data object of the organization identifier that would trigger generating one or more responder alert data object. In such an example, the processing circuitry may generate the condition metadata of the global alert policy data object that corresponds to the condition metadata as described by the global alert policy creation metadata.

In some embodiments, the one or more global alert policy data objects generated at step/operation 505 are associated with an organization identifier. For example, these global alert policy data objects may be associated with the organization identifier that is the same as the organization identifier associated with the client device from which the global alert policy creation metadata is received at step/operation 503.

Additionally, or alternatively, the global alert policy creation metadata received at step/operation 503 defines at least one condition metadata and at least one alert metadata associated with a project identifier, and the one or more global alert policy data objects generated at step/operation 505 are associated with the same project identifier. In this example, these global alert policy data objects may be associated with the project identifier as specified by the client device in the global alert policy creation metadata received at step/operation 503.

Additionally, or alternatively, the global alert policy creation metadata received at step/operation 503 defines at least one condition metadata and at least one alert metadata associated with an issue identifier, and the one or more global alert policy data objects generated at step/operation 505 are associated with the same issue identifier. In this example, these global alert policy data objects may be associated with the issue identifier as specified by the client device in the global alert policy creation metadata received at step/operation 503.

Referring back to FIG. 5, subsequent to step/operation 505, the method 500 proceeds to step/operation 507. At step/operation 507, a processing circuitry (such as the processor 305 of the incident alert and management server 107 described above in connection with at least FIG. 1A and FIG. 3) stores one or more global alert policy data objects.

In some embodiments, the processing circuitry stores the one or more global alert policy data objects in the global alert policy data repository. As described above, the global alert policy data repository is a type of data repository (e.g. network data storage devices, network storage locations, etc.) that may be part of the incident alert and management platform and may store global alert policy data objects associated with various organizations that have access to or use the incident alert and management platform. In some embodiments, subsequent to generating the one or more global alert policy data objects at step/operation 505, the processing circuitry may transmit the one or more global alert policy data objects to the global alert policy data repository for storage.

In some embodiments, in response to receiving an incident data object associated with an organization identifier, the processing circuitry may query to the global alert policy data repository based on the organization identifier to retrieve one or more global alert policy data objects associated with the organization identifier, similar to those described above in connection with at least FIG. 4.

Additionally, or alternatively, in response to receiving an incident data object associated with a project identifier, the processing circuitry may query to the global alert policy data repository based on the project identifier to retrieve one or more global alert policy data objects associated with the project identifier, similar to those described above.

Additionally, or alternatively, in response to receiving an incident data object associated with an issue identifier, the processing circuitry may query to the global alert policy data repository based on the issue identifier to retrieve one or more global alert policy data objects associated with the issue identifier, similar to those described above.

Referring back to FIG. 5, subsequent to step/operation 507, the method 500 proceeds to step/operation 509 and ends.

Referring now to FIG. 6, an example method 600 is illustrated. In particular, the example method 600 illustrates example steps/operations of establishing data associations between inline alert policy data objects and the incident data objects in accordance with some embodiments of the present disclosure.

In the example shown in FIG. 6, the example method 600 starts at block 602 and then proceeds to step/operation 604. At step/operation 604, a processing circuitry (such as the processor 305 of the incident alert and management server 107 described above in connection with at least FIG. 1A and FIG. 3) replicates the global alert policy data object. In some embodiments, the processing circuitry replicates the global alert policy data object as the inline alert policy data object.

For example, as described above in connection with at least FIG. 4, the processing circuitry may determine that a global alert policy data object corresponds to an incident data object. For example, the processing circuitry determines that one or more conditions associated with the global alert policy data object correspond to or match one or more types, one or more categories, one or more tags, one or more priorities, one or more messages, one or more characteristics, and/or one or more attributes of the incident data object. In such examples, both the global alert policy data object and the incident data object are associated with the same organization identifier, the same project identifier, and/or the same issue identifier.

Continuing from the above example, the processing circuitry may duplicate the global alert policy data object and/or create a local copy of the global alert policy data object. The processing circuitry may assign the duplicated or local copy of the global alert policy data object as the inline alert policy data object associated with the incident data object.

In various embodiments of the present disclosure, generating an inline alert policy data object that is separate from a global alert policy data object provides various technical benefits and advantages. For example, changes of a global alert policy data object may result in changes in generating responder alert data objects for multiple incident data objects that correspond to the global alert policy data object. In contrast, changes of an inline alert policy data object may result in changes in generating responder alert data objects for the one specific incident data object that the example inline alert policy data object is associated with, without affecting other responder alert data objects for other incident data objects. As such, generating inline alert policy data objects provides flexibility to organizations to control the generation of alerts and/or to fine-tune these alerts based on the specific need of the organization, the project, and/or the issue, thereby reducing unwanted and unnecessary alerts.

Referring back to FIG. 6, subsequent to step/operation 604, the method 600 proceeds to step/operation 606. At step/operation 606, a processing circuitry (such as the processor 305 of the incident alert and management server 107 described above in connection with at least FIG. 1A and FIG. 3) establishes a data association between the inline alert policy data object and the incident data object.

In some embodiments, the inline alert policy data object may be stored in a data repository (such as, but not limited to, the inline alert policy data repository 103B described above in connection with at least FIG. 1A and FIG. 1B) in the incident alert and management platform. In some embodiments, the processing circuitry may identify a network storage location of the inline alert policy data object in the data repository. In some embodiments, the incident data object may comprise an alert field or an alert metadata that represents and/or indicates an alert policy associated with the incident data object. In some embodiments, the processing circuitry may establish a data association between the inline alert policy data object and the incident data object by updating the alert field or the alert metadata of the incident data object to indicate the network storage location of the inline alert policy data object in the inline alert policy data repository.

Additionally, or alternatively, the processing circuitry may establish a data association between the inline alert policy data object and the incident data object based on associating the network storage location of the inline alert policy data object with an identifier of the incident data object. For example, the incident alert and management platform may comprise a reference table that indicates correlations between inline alert policy data objects stored in the inline alert policy data repository and the incident data objects. In such an example, the processing circuitry may update the reference table to establish a data association between the inline alert policy data object and the incident data object.

While the description above provides an example of establishing a data association between the inline alert policy data object and the incident data object, it is noted that the scope of the present disclosure is not limited to the description above. In some examples, an example method may establish a data association between the inline alert policy data object and the incident data object through additional and/or alternative means.

Referring back to FIG. 6, subsequent to step/operation 606, the method 600 proceeds to step/operation 608 and ends.

Referring now to FIG. 7, an example method 700 is illustrated. In particular, the example method 700 illustrates example steps/operations of determining whether to generate one or more responder alert data objects in accordance with some embodiments of the present disclosure.

In the example shown in FIG. 7, the example method 700 starts at block 701 and then proceeds to step/operation 703. At step/operation 703, a processing circuitry (such as the processor 305 of the incident alert and management server 107 described above in connection with at least FIG. 1A and FIG. 3) determines incident metadata associated with an incident data object.

In some embodiments, the processing circuitry may receive an incident data object that is associated with an organization identifier. As described above in connection with at least FIG. 4, an incident alert and management platform may programmatically monitor and/or detect one or more incidents in a computing network system of an organization, and may generate one or more incident data objects based on the one or more incidents. Additionally, or alternatively, an incident alert and management platform may generate one or more incident data objects based on user inputs that describe one or more network incidents.

In some embodiments, the incident metadata defines one or more types, one or more categories, one or more tags, one or more priorities, one or more messages, one or more characteristics, and/or one or more attributes of an incident data object, similar to those described above. For example, the incident metadata may represent the type, the tag, the priority, the message, the characteristic, and/or the attribute of the indicate that the incident data object represents.

In some embodiments, the processing circuitry may determine the incident metadata associated with the incident data object based at least in part on extracting the incident metadata from the incident data object. While the description above provides an example of determining the incident metadata, it is noted that the scope of the present disclosure is not limited to the description above. In some examples, an example method may determine the incident metadata associated with the incident data object based on one or more additional and/or alternative means.

Referring back to FIG. 7, subsequent to step/operation 703, the method 700 proceeds to step/operation 705. At step/operation 705, a processing circuitry (such as the processor 305 of the incident alert and management server 107 described above in connection with at least FIG. 1A and FIG. 3) determines whether to generate one or more responder alert data objects.

In some embodiments, the processing circuitry may determine whether to generate the one or more responder alert data objects based at least in part on the incident metadata associated with the incident data object that is determined at step/operation 703.

Similar to those described above in connection with at least FIG. 4, the processing circuitry may retrieve one or more global alert policy data objects from a global alert policy data repository associated with the same organization identifier, the same project identifier, and/or the same issue identifier as that of the incident data object. For example, the processing circuitry may retrieve the one or more global alert policy data objects based on querying the global alert policy data repository according to the organization identifier, the project identifier, and/or the issue identifier. In some embodiments, the retrieved global alert policy data objects may comprise condition metadata. For example, the condition metadata associated with the retrieved global alert policy data object represents, defines, and/or comprises one or more conditions for generating responder alert data objects.

In some embodiments, the processing circuitry may determine whether the retrieved global alert policy data object corresponds to the incident data object associated with step/operation 703. For example, the processing circuitry may determine whether the one or more conditions associated with the global alert policy data objects correspond to or match the incident metadata determined at step/operation 703. For example, the processing circuitry may determine whether the one or more types, one or more categories, one or more tags, one or more priorities, one or more messages, one or more characteristics, and/or one or more attributes associated with the incident metadata correspond to or match the conditions associated with the global alert policy data object.

In some embodiments, the processing circuitry may determine whether to generate one or more responder alert data objects based on a global alert policy data object that corresponds to or matches the incident data object. For example, the global alert policy data object may comprise alert metadata, and the alert metadata defines or specifies whether to generate a responder alert data object. As such, based on the alert metadata associated with the global alert policy data object that corresponds to or matches the incident data object, the processing circuitry may determine whether to generate a responder alert data object for the incident data object.

Referring back to FIG. 7, if, at step/operation 705, the processing circuitry determines to generate one or more responder alert data objects, the method 700 proceeds to step/operation 707. At step/operation 707, a processing circuitry (such as the processor 305 of the incident alert and management server 107 described above in connection with at least FIG. 1A and FIG. 3) determines a creation time metadata.

In some embodiments, the processing circuitry determines a creation time metadata associated with the one or more responder alert data objects in response to determining to generate the one or more responder alert data objects at step/operation 705.

In some embodiments, the creation time metadata indicates a creation time associated with the one or more responder alert data objects. As described above, the global alert policy data object may define metadata associated with one or more responder alert data objects (such as, but not limited to, creation time metadata). Continuing from the example above, subsequent to the processing circuitry determining that a global alert policy data object corresponds to or matches the incident data object, the processing circuitry may determine that the global alert policy data object comprises alert metadata that defines generating a responder alert data object for the incident data object. In this example, the processing circuitry may determine the creation time metadata for the responder alert data object based on the global alert policy data object.

Referring back to FIG. 7, subsequent to step/operation 707, the method 700 proceeds to step/operation 709. At step/operation 709, a processing circuitry (such as the processor 305 of the incident alert and management server 107 described above in connection with at least FIG. 1A and FIG. 3) generates the one or more responder alert data objects at the creation time.

In various embodiments of the present disclosure, programmatically determining whether to generate one or more responder alert data objects and generating the one or more responder alert data objects at creation times defined by one or more global alert policy data objects provide various technical improvements and advantages. As described above, an example responder alert data object may define, comprise, and/or represent one or more push notifications, electronic mails, text messages, and/or other types of alerts associated with the incident data object and to be transmitted to a client device associated with a responder. In a complex network system (such as where multiple incidents may occur within a short time period), generating multiple responder alert data objects at the same time may cause network congestion and reduce overall processing speed of the complex network system. In contrast, by programmatically determining whether to generate one or more responder alert data objects and generating the one or more responder alert data objects at creation times defined by one or more global alert policy data objects, various embodiments of the present disclosure reduce the risk of network congestion, reduce latency of the network system, and improve computing speed of the network system.

Referring back to FIG. 7, subsequent to step/operation 709, the method 700 proceeds to step/operation 715 and ends.

If, at step/operation 705, the processing circuitry determines not to generate one or more responder alert data objects, the method 700 proceeds to step/operation 711. At step/operation 711, a processing circuitry (such as the processor 305 of the incident alert and management server 107 described above in connection with at least FIG. 1A and FIG. 3) generates a no-alert electronic indication.

In some embodiments, the processing circuitry generates a no-alert electronic indication in response to determining not to generate the one or more responder alert data objects at step/operation 705.

Continuing from the example above, subsequent to the processing circuitry determining that a global alert policy data object corresponds to or matches the incident data object, the processing circuitry may determine that the global alert policy data object comprises alert metadata that defines not to generate a responder alert data object for the incident data object, and the processing circuitry may generate a no-alert electronic indication.

In some embodiments, the no-alert electronic indication may be in the form of push notifications, electronic mails, text messages, and/or other types of indication and comprise data and/or information indicating that no alert will be generated for the incident associated with the incident data object of step/operation 703.

Referring back to FIG. 7, subsequent to step/operation 711, the method 700 proceeds to step/operation 713. At step/operation 713, a processing circuitry (such as the processor 305 of the incident alert and management server 107 described above in connection with at least FIG. 1A and FIG. 3) transmits the no-alert electronic indication to a client device.

In some embodiments, the processing circuitry transmits the no-alert electronic indication to a client device that is associated with an organization identifier. For example, as described above in connection with step/operation 703, the processing circuitry may receive an incident data object that is associated with an organization identifier. At step/operation 713, the processing circuitry may transmit the no-alert electronic indication to a client device that is associated with the same organization identifier as that of step/operation 703.

Referring back to FIG. 7, subsequent to step/operation 713, the method 700 proceeds to step/operation 715 and ends.

While the description above provides an example of determining whether to generate one or more responder alert data objects, it is noted that the scope of the present disclosure is not limited to the description above. In some examples, a processing circuitry may determine whether to generate one or more responder alert data objects through other additional and/or alternative means. For example, the processing circuitry may determine whether the incident data object is associated with an incident that was previously associated with a resolved status and subsequently reopened or copied. If so, the processing circuitry may determine not to generate the one or more responder alert data objects. If not, the processing circuitry may proceed to method 700 described and illustrated in connection with at least FIG. 7.

Referring now to FIG. 8, an example method 800 is illustrated. In particular, the example method 800 illustrates example steps/operations of determining one or more responder alert data objects in accordance with some embodiments of the present disclosure.

In the example shown in FIG. 8, the example method 800 starts at block 802 and then proceeds to step/operation 804. At step/operation 804, a processing circuitry (such as the processor 305 of the incident alert and management server 107 described above in connection with at least FIG. 1A and FIG. 3) receives an incident data object.

In some embodiments, the processing circuitry may receive an incident data object that is associated with an organization identifier, a project identifier, and/or an issue identifier, similar to those described above. For example, as described above in connection with at least FIG. 4, an incident alert and management platform may programmatically monitor and/or detect one or more incidents in a computing network system of an organization, and may generate one or more incident data objects based on the one or more incidents. Additionally, or alternatively, an incident alert and management platform may generate one or more incident data objects based on user inputs that describe one or more network incidents.

Referring back to FIG. 8, subsequent to step/operation 804, the method 800 proceeds to step/operation 806. At step/operation 806, a processing circuitry (such as the processor 305 of the incident alert and management server 107 described above in connection with at least FIG. 1A and FIG. 3) determines whether an existing inline alert policy data object is associated with the incident data object.

In some embodiments, the processing circuitry may determine whether an existing inline alert policy data object is associated with the incident data object based at least in part on an alert field or alert metadata of the incident data object. As described above, the incident data object may comprise an alert field or an alert metadata that represents and/or indicates an alert policy associated with the incident data object. If the alert field or the alert metadata comprises data and/or information representing an alert policy (for example, a network storage location in the inline alert policy data repository), the processing circuitry determines that an existing inline alert policy data object is associated with the incident data object. If the alert field or the alert metadata does not comprise data and/or information representing an alert policy (for example, if the alert field or the alert metadata is left blank), the processing circuitry determines that there is no existing inline alert policy data object associated with the incident data object.

Additionally, or alternatively, the processing circuitry may determine whether an existing inline alert policy data object is associated with the incident data object based on querying an inline alert policy data repository. For example, the processing circuitry may transmit a query to the inline alert policy data repository based on the organization identifier, the project identifier, the issue identifier, and/or an identifier associated with the incident data object. If the inline alert policy data repository returns an inline alert policy data object in response to the query from the processing circuitry, the processing circuitry determines that an existing inline alert policy data object is associated with the incident data object. If the inline alert policy data repository does not return any inline alert policy data object in response to the query from the processing circuitry, the processing circuitry determines that no existing inline alert policy data object is associated with the incident data object.

While the description above provides an example of determining whether an existing inline alert policy data object is associated with the incident data object, it is noted that the scope of the present disclosure is not limited to the description above. In some examples, an example method may comprise one or more additional and/or alternative means to determine whether an existing inline alert policy data object is associated with the incident data object.

Referring back to FIG. 8, if, at step/operation 806, the processing circuitry determines that the existing inline alert policy data object is not associated with the incident data object, the method 800 proceeds to step/operation 808. At step/operation 808, a processing circuitry (such as the processor 305 of the incident alert and management server 107 described above in connection with at least FIG. 1A and FIG. 3) triggers retrieving one or more default alert policy data objects.

In some embodiments, the processing circuitry triggers retrieving one or more default alert policy data objects in response to determining that the existing inline alert policy data object is not associated with the incident data object at step/operation 806. Similar to those described above in connection with at least FIG. 4, the processing circuitry the processing circuitry may retrieve the one or more default alert policy data objects based on querying an alert policy data repository according to an organization identifier, a project identifier, and/or an issue identifier associated with the incident data object received at step/operation 804.

Referring back to FIG. 8, subsequent to step/operation 808, the method 800 proceeds to step/operation 810. At step/operation 808, a processing circuitry (such as the processor 305 of the incident alert and management server 107 described above in connection with at least FIG. 1A and FIG. 3) generates an inline alert policy data object.

In some embodiments, subsequent to triggering triggers retrieving one or more default alert policy data objects at step/operation 808, the processing circuitry may generate an inline alert policy data object based on the default alert policy data objects, receive inline alert policy edit metadata, and generate one or more responder alert data objects similar to those described above in connection with at least FIG. 4. In some embodiments, the inline alert policy data object generated at step/operation 810 is a duplicated, local copy of the default alert policy data object retrieved at step/operation 808.

Referring back to FIG. 8, subsequent to step/operation 808, the method 800 proceeds to step/operation 814 and ends.

If, at step/operation 806, the processing circuitry determines that the existing inline alert policy data object is associated with the incident data object, the method 800 proceeds to step/operation 812. At step/operation 812, a processing circuitry (such as the processor 305 of the incident alert and management server 107 described above in connection with at least FIG. 1A and FIG. 3) renders an inline alert policy edit user interface.

In some embodiments, the processing circuitry renders the inline alert policy edit user interface in response to determining that the existing inline alert policy data object is associated with the incident data object at step/operation 806.

In some embodiments, similar to those described above in connection with at least FIG. 4, the processing circuitry may cause rendering of an inline alert policy edit user interface on a display of a client device associated with an organization identifier that is the same as the organization identifier associated with the incident data object received at step/operation 804. In some embodiments, the inline alert policy edit user interface is associated with the existing inline alert policy data object determined at step/operation 806. For example, the inline alert policy edit user interface comprises a rendering of the existing inline alert policy data object determined at step/operation 806.

In some embodiments, subsequent to rendering the inline alert policy edit user interface at step/operation 812, the processing circuitry may receive inline alert policy edit metadata, and generate one or more responder alert data objects, similar to those described above in connection with at least FIG. 4.

Referring back to FIG. 8, subsequent to step/operation 812, the method 800 proceeds to step/operation 814 and ends.

Referring now to FIG. 9, an example method 900 is illustrated. In particular, the example method 900 illustrates example steps/operations of updating one or more responder alert data objects in accordance with some embodiments of the present disclosure.

In the example shown in FIG. 9, the example method 900 starts at block 901 and then proceeds to step/operation 903. At step/operation 903, a processing circuitry (such as the processor 305 of the incident alert and management server 107 described above in connection with at least FIG. 1A and FIG. 3) receives update metadata.

In some embodiments, the processing circuitry receives update metadata associated with an incident data object, and updates the one or more responder alert data objects based at least in part on the update metadata.

As described above, update metadata refers to a type of metadata associated with an incident data object that defines one or more updates or changes associated with the incident data object. In some embodiments, the update metadata may provide one or more changes/updates to the incident metadata and/or the status metadata associated with the incident data object. For example, the update metadata may provide one or more changes/updates to the status metadata associated with the incident data object (e.g., a change of the status of the incident data object from an "open" status to a "closed" status or to a "resolved" status).

In some embodiments, an incident alert and management platform may programmatically monitor and/or detect one or more incidents in a computing network system of an organization, and may generate update metadata accordingly. In some embodiments, an incident alert and management platform may generate update metadata based on user inputs that describe updates to one or more network incidents.

Referring back to FIG. 9, subsequent to step/operation 903, the method 900 proceeds to step/operation 905. At step/operation 905, a processing circuitry (such as the processor 305 of the incident alert and management server 107 described above in connection with at least FIG. 1A and FIG. 3) determines whether the updated status metadata indicates that the incident data object is closed or resolved.

As described above, the "closed" status indicates that the incident associated with the incident data object is closed and/or no longer requires any action from a responder of the organization (e.g. no longer requires any actions from system administrator(s) of the computing network system of the organization, IT support personnel of the organization, human resource personnel of the organization, management personnel of the organization, and/or the like). When the status metadata associated with an incident data object is changed to "closed," the corresponding incident data object cannot be reopened (i.e. the status of the incident data object cannot be changed back to "open").

In some embodiments, the "resolved" status indicates that the incident associated with the incident data object is resolved and/or no longer requires any action from a responder of the organization. When the status metadata associated with an incident data object is changed to "resolved," the corresponding incident data object may still be reopened (i.e. the status of the incident data object can be changed back to "open").

Referring back to FIG. 9, if, at step/operation 905, the processing circuitry determines that the updated status metadata does not indicate that the incident data object is closed or resolved, the method 900 proceeds to step/operation 909 and ends. In such embodiments, the processing circuitry determines that the incident associated with the incident data object is still ongoing and may require action from a responder of the organization (e.g. may require some actions from system administrator(s) of the computing network system of the organization, IT support personnel of the organization, human resource personnel of the organization, management personnel of the organization, and/or the like).

Referring back to FIG. 9, if, at step/operation 905, the processing circuitry determines that the updated status metadata indicates that the incident data object is closed or resolved, the method 900 proceeds to step/operation 907. At step/operation 907, a processing circuitry (such as the processor 305 of the incident alert and management server 107 described above in connection with at least FIG. 1A and FIG. 3) updates the one or more responder alert data objects.

In some embodiments, the processing circuitry may deter how to update the one or more responder alert data objects based on the inline alert policy creation metadata and/or the inline alert policy edit metadata from the user when generating the inline alert policy data object associated with the incident data object. For example, the user may provide user inputs defining one or more changes to the responder alert data objects when the corresponding incident data object is associated with a "closed" status. Additionally, or alternatively, the user may provide user inputs defining one or more changes to the responder alert data objects when the corresponding incident data object is associated with a "resolved" status.

For example, the processing circuitry may remove one or more responder alert data objects. As described above, the "closed" status as indicated status metadata of an incident data object indicates that the incident associated with the incident data object is closed and/or no longer requires any action from a responder of the organization. As such, in some embodiments, the processing circuitry removes the one or more responder alert data objects in response to determining that the updated status metadata indicates that the incident data object is closed at step/operation 907.

Additionally, or alternatively, the processing circuitry may perform one or more other operations on the one or more responder alert data objects as specified by the user in the inline alert policy data object when the status of the corresponding incident data object changes to closed or resolved, detail of which are described herein. For example, the processing circuitry may generate one or more acknowledgement responder alerts when the indicate data object is changed to a resolved status or a closed status (as defined by the user inputs). Additionally, or alternatively, the processing circuitry may perform no operation when the status of the corresponding incident data object changes to closed or resolved.

In various embodiments of the present disclosure, dynamically updating/removing responder alert data objects based on the update metadata provide various technical improvements and advantages. For example, the update metadata provides the most up-to-date status of the incident, and by removing responder alert data objects for incidents that have been closed can reduce unwanted and unnecessary alerts, as well as reduce the latency of the network computer system in processing various data requests.

Referring back to FIG. 9, subsequent to step/operation 907, the method 900 proceeds to step/operation 909 and ends.

Example User Interfaces for Implementing Embodiments of the Present Disclosure

Various example user interfaces described herein, including, for example, those as shown in FIG. 10 to FIG. 20, may provide various technical advantages and/or improvements described above. In particular, FIG. 10 to FIG. 20 illustrate various example user interfaces associated with generating, editing, and/or managing global alert policy data objects and/or inline alert policy data objects.

Referring now to FIG. 10, an example global alert policy creation user interface 1000 in accordance with some embodiments of the present disclosure is illustrated.

In the example shown in FIG. 10, the example global alert policy creation user interface 1000 comprises a global alert policy creation user interface title section 1002 positioned on the top of the example global alert policy creation user interface 1000. In some embodiments, the global alert policy creation user interface title section 1002 displays the title of the example global alert policy creation user interface 1000 (e.g. "incident policies").

In some embodiments, the example global alert policy creation user interface 1000 comprises a side menu bar 1010. In the example shown in FIG. 10, the side menu bar 1010 is positioned to the left of the global alert policy creation user interface 1000. The side menu bar 1010 may provide one or more user interface options associated with an example incident alert and management platform. For example, the side menu bar 1010 may provide an incident policies option 1008. When a user clicks using a computer mouse, taps via a touch screen, or otherwise selects the incident policies option 1008, the example global alert policy creation user interface 1000 may be refreshed to display a global alert policy data object table 1006.

As shown in FIG. 10, the global alert policy data object table 1006 may comprise a list of names associated with one or more global alert policy data objects. As described above, a global alert policy data object is associated with an organization identifier, and the global alert policy data object table 1006 may display names of one or more global alert policy data objects associated with a particular organization identifier. In the example shown in FIG. 10, the global alert policy data object table 1006 is positioned under the global alert policy creation user interface title section 1002.

In some embodiments, the global alert policy data object table 1006 indicates priorities associated with global alert policy data objects that are listed in the global alert policy data object table 1006. As described above, a processing circuitry may retrieve one or more global alert policy data objects in response to receiving an incident data object, and may determine whether the one or more global alert policy data objects correspond to the incident data object. In some embodiments, the processing circuitry may traverse the list of incident data objects in the global alert policy data object table 1006 from top to bottom to determine whether there is a global alert policy data object that corresponds to the incident data object. For example, if the processing circuitry determines that the first global alert policy data object in the global alert policy data object table 1006 does not match the incident data object, the processing circuitry determines whether the second global alert policy data object in the global alert policy data object table 1006 matches the incident data object, . . . , until a global alert policy data object that matches the incident data object is identified or until all global alert policy data objects in the global alert policy data object table 1006 have been traversed.

As such, in some embodiments, the order of the global alert policy data objects in the global alert policy data object table 1006 indicates a priority of the global alert policy data objects. If there are multiple global alert policy data objects that correspond to or match the incident data object, the global alert policy data object with the highest priority may be used to generate an inline alert policy data object. In some embodiments, the order of the global alert policy data objects in the global alert policy data object table 1006 may be defined by a user (such as, but not limited to, system administrator(s) of the computing network system). In some embodiments, the order of the global alert policy data objects in the global alert policy data object table 1006 may be programmatically determined.

In some embodiments, the example global alert policy creation user interface 1000 further comprises a create incident policy button 1004. In the example shown in FIG. 10, the create incident policy button 1004 is positioned above the global alert policy data object table 1006 and to the right of the global alert policy creation user interface title section 1002. In some embodiments, when a user clicks using a computer mouse, taps via a touch screen, or otherwise selects the create incident policy button 1004, the example global alert policy creation user interface 1000 is refreshed to display example global alert policy creation pane, where a user can define metadata associated with a global alert policy data object to generate the global alert policy data object.

Referring now to FIG. 11, an example global alert policy creation pane 1100 of an example global alert policy creation user interface in accordance with some embodiments of the present disclosure is illustrated.

In the example shown in FIG. 11, the example global alert policy creation pane 1100 comprises a pane title section 1101, a global alert policy data object name section 1103, a condition metadata configuration section 1105, an alert metadata configuration section 1107, a stakeholder configuration section 1109, an associated alert configuration section 1111, a global alert policy data object toggle 1113, a cancel button 1115, and a create button 1117.

For example, the pane title section 1101 is positioned on top of the example global alert policy creation pane 1100 and displays a name associated with the example global alert policy creation pane 1100 (e.g. "Create Incident Policy").

In some embodiments, the global alert policy data object name section 1103 is positioned under the pane title section 1101. The global alert policy data object name section 1103 may comprise an input box that allows a user to specify/define a name of the to-be-created global alert policy data object.

In some embodiments, the condition metadata configuration section 1105 is positioned under the global alert policy data object name section 1103. In the example shown in FIG. 11, the condition metadata configuration section 1105 comprises one or more user interface elements (such as, but not limited to, a condition logic drop-down menu trigger 1119, a condition type drop-down menu trigger 1121, a condition true/false drop-down menu trigger 1123, a condition match drop-down menu trigger 1125, and a condition input field 1127) that allow a user to provide user inputs associated with condition metadata. For example, a user may provide user inputs via the condition metadata configuration section 1105 to specify/define condition metadata associated with the to-be-created global alert policy data object, details of which are described herein.

In some embodiments, the alert metadata configuration section 1107 is positioned under the condition metadata configuration section 1105. In the example shown in FIG. 11, the alert metadata configuration section 1107 comprises one or more user interface elements that allow a user to provide user inputs associated with alert metadata. For example, a user may provide user inputs via the alert metadata configuration section 1107 to specify/define alert metadata associated with the to-be-created global alert policy data object, details of which are described herein.

In some embodiments, the stakeholder configuration section 1109 is positioned under the alert metadata configuration section 1107. In some embodiments, the stakeholder configuration section 1109 provides an option to enable or disable stakeholder communication associated with the to-be-created global alert policy data object, details of which are described herein.

In some embodiments, the associated alert configuration section 1111 is positioned under the stakeholder configuration section 1109. In some embodiments, the associated alert configuration section 1111 comprises one or more user interface elements that allow a user to provide user inputs on associated alerts, details of which are described herein.

In some embodiments, the global alert policy data object toggle 1113 is positioned under the associated alert configuration section 1111. In some embodiments, the global alert policy data object toggle 1113 provides an option to enable or disable the global alert policy data object, details of which are described herein.

In some embodiments, the example global alert policy creation pane 1100 comprises a cancel button 1115 and a create button 1117. When a user clicks using a computer mouse, taps via a touch screen, or otherwise selects the cancel button 1115, the creation of a global alert policy data object is canceled. When a user clicks using a computer mouse, taps via a touch screen, or otherwise selects the create button 1117, a global alert policy data object is created (for example, based on various metadata that are determined based on user inputs received from various sections of the example global alert policy creation pane 1100).

Referring now to FIG. 12, example user interface elements of an example global alert policy creation pane 1200 in accordance with some embodiments of the present disclosure are illustrated. In particular, FIG. 12 illustrates an example global alert policy data object name section 1202 and an example condition metadata configuration section 1204 of the example global alert policy creation pane 1200.

Similar to those described above in connection with at least FIG. 11, the example global alert policy data object name section 1202 may comprise an input box that allows a user to specify/define a name for the to-be-generated global alert policy data object.

In the example shown in FIG. 12, the example condition metadata configuration section 1204 comprises a condition logic drop-down menu trigger 1206. When a user clicks using a computer mouse, taps via a touch screen, or otherwise selects the condition logic drop-down menu trigger 1206, the example global alert policy creation pane 1200 is updated to display a condition logic drop-down menu 1208. In the example shown in FIG. 12, the condition logic drop-down menu 1208 provides options such as, but not limited to, "match all incidents," "match all of below conditions," and "match any of the below conditions."

In some embodiments, when a user clicks using a computer mouse, taps via a touch screen, or otherwise selects "match all incidents" option from the condition logic drop-down menu 1208, a processing circuitry (such as the processor 305 of the incident alert and management server 107 described above in connection with at least FIG. 1A and FIG. 3) may generate a global alert policy data object that is applicable to all incident data objects. In other words, the global alert policy data object corresponds to/matches all incident data objects. In such an example, the resultant global alert policy data object is a default alert policy data object.

In some embodiments, when a user clicks using a computer mouse, taps via a touch screen, or otherwise selects "match all of below conditions" option from the condition logic drop-down menu 1208, a processing circuitry (such as the processor 305 of the incident alert and management server 107 described above in connection with at least FIG. 1A and FIG. 3) may generate a global alert policy data object that only corresponds to or matches incident data objects that satisfies all the conditions of the condition metadata of the global alert policy data object.

In some embodiments, when a user clicks using a computer mouse, taps via a touch screen, or otherwise selects "match any of below conditions" option from the condition logic drop-down menu 1208, a processing circuitry (such as the processor 305 of the incident alert and management server 107 described above in connection with at least FIG. 1A and FIG. 3) may generate a global alert policy data object that corresponds to or matches incident data objects that satisfies any of the conditions of the condition metadata of the global alert policy data object.

As such, the condition logic drop-down menu 1208 provides flexibility (e.g. providing logic AND/OR options) in generating global alert policy data objects.

Referring now to FIG. 13, example user interface elements of an example global alert policy creation pane 1300 in accordance with some embodiments of the present disclosure are illustrated. In particular, FIG. 13 illustrates an example global alert policy data object name section 1301 and various user interface elements associated with a condition metadata configuration section of the example global alert policy creation pane 1300.

Similar to those described above in connection with at least FIG. 11 and FIG. 12, the example global alert policy data object name section 1301 may comprise an input box that allows a user to specify/define a name for the to-be-generated global alert policy data object. Similar to those described above in connection with at least FIG. 11 and FIG. 12, the example global alert policy creation pane 1300 may comprise a condition logic drop-down menu trigger 1303.

In the example shown in FIG. 13, the example global alert policy creation pane 1300 comprises a condition type drop-down menu trigger 1305, a condition true/false drop-down menu trigger 1307, a condition match drop-down menu trigger 1309, and a condition input field 1311.

In some embodiments, when a user clicks using a computer mouse, taps via a touch screen, or otherwise selects the condition type drop-down menu trigger 1305, the example global alert policy creation pane 1300 will be updated to display a condition type drop-down menu 1313.

In the example shown in FIG. 13, the condition type drop-down menu 1313 may include options such as, but not limited to, message, priority, tags. When a user clicks using a computer mouse, taps via a touch screen, or otherwise selects the message option, a processing circuitry (such as the processor 305 of the incident alert and management server 107 described above in connection with at least FIG. 1A and FIG. 3) may generate condition metadata that specifies/is based on a message associated with an incident data object. When a user clicks using a computer mouse, taps via a touch screen, or otherwise selects the priority option, the processing circuitry may generate condition metadata that specifies/is based on a priority associated with an incident data object. When a user clicks using a computer mouse, taps via a touch screen, or otherwise selects the tags option, the processing circuitry may generate condition metadata that specifies/is based on a tag associated with an incident data object.

In some embodiments, when a user clicks using a computer mouse, taps via a touch screen, or otherwise selects the condition true/false drop-down menu trigger 1307, the example global alert policy creation pane 1300 will be updated to display a condition true/false drop-down menu 1315. In the example shown in FIG. 13, the condition true/false drop-down menu 1315 may include options such as, but not limited to, IS or NOT.

In some embodiments, when a user clicks using a computer mouse, taps via a touch screen, or otherwise selects the condition match drop-down menu trigger 1309, the example global alert policy creation pane 1300 will be updated to display a condition match drop-down menu 1317. In the example shown in FIG. 13, the condition match drop-down menu 1317 may include options such as, but not limited to, equals or contains.

In some embodiments, options in the condition true/false drop-down menu 1315 and/or the condition match drop-down menu 1317 may change based on the selected option from the condition type drop-down menu 1313. For example, if the "message" option is selected from the condition type drop-down menu 1313, the condition true/false drop-down menu 1315 and/or the condition match drop-down menu 1317 may provide options such as, but not limited to, "equals," "not equals," "contains," "not contains," and/or the like. If the "priority" option is selected from the condition type drop-down menu 1313, the condition true/false drop-down menu 1315 and/or the condition match drop-down menu 1317 may provide options such as, but not limited to, "equal to," "greater than," "less than," and/or the like.

In some embodiments, a user may provide user inputs to the condition input field 1311. For example, the user may provide user inputs associated with the condition metadata, such as, but not limited to, user inputs describing message, priority, and/or tags of incident data objects that would satisfy (or not satisfy) the condition as described in the condition metadata.

As illustrated in the example shown in FIG. 13, various embodiments of the present disclosure provide flexibility in enabling a user to customize and/or configure conditions associated with the condition metadata of the global alert policy data object. For example, a user may specify/define conditions such as, but not limited to, "if an incident contains tag," "if priority is less than P3," and/or the like.

While the description above provides an example of one condition in the example user interface, it is noted that the scope of the present disclosure is not limited to the description above. In some examples, example condition metadata associated with an example global alert policy data object may comprise multiple conditions. For example, the logical relationships between the multiple conditions of the global alert policy data object may be specified and/or defined by the user by using a condition logic drop-down menu that can be triggered by the condition logic drop-down menu trigger 1303, similar to those described above.

Referring now to FIG. 14, example user interface elements of an example global alert policy creation pane 1400 in accordance with some embodiments of the present disclosure are illustrated. In particular, FIG. 14 illustrates various example user interface elements associated with an example alert metadata configuration section 1412 of the example global alert policy creation pane 1400.

In some embodiments, the example alert metadata configuration section 1412 of the example global alert policy creation pane 1400 may enable a user to specify and/or define: (1) whether to create a responder alert data object, and, if yes, when to create the responder alert data object (e.g. the creation time metadata) and/or (2) what to do with responder alert data object when the corresponding incident is resolved or closed (e.g. when the update metadata indicates that the status metadata associated with the incident data object is resolved or closed).

For example, the example alert metadata configuration section 1412 shown in FIG. 14 may comprise an example creation time metadata configuration section 1402. In the example shown in FIG. 14, the example creation time metadata configuration section 1402 may provide options such as, but not limited to, "don't create responder alerts," "create alerts immediately," "create alerts after x amount of time," and "create alerts x amount of time before SLA breach."

Additionally, or alternatively, the example alert metadata configuration section 1412 shown in FIG. 14 may comprise incident status drop-down menu trigger 1404 and alert status drop-down menus trigger 1406. When a user clicks using a computer mouse, taps via a touch screen, or otherwise selects the incident status drop-down menu trigger 1404, the example global alert policy creation pane 1400 may be updated to display an incident status drop-down menu 1408. In the example shown in FIG. 14, the incident status drop-down menu 1408 may provide options such as, but not limited to, "resolved" (when the incident is resolved) and "closed" (when the incident is closed). When a user clicks using a computer mouse, taps via a touch screen, or otherwise selects the alert status drop-down menus trigger 1406, the example global alert policy creation pane 1400 may be updated to display an alert status drop-down menu 1410. In the example shown in FIG. 14, the alert status drop-down menu 1410 may provide options such as, but not limited to, "acknowledge," "closed," and "no operation."

Based at least in part on the incident status drop-down menu 1408 and the alert status drop-down menus trigger 1406, a user may specify or define what to do with responder alert data object when an incident is resolved or closed. For example, the user may specify or define generating an acknowledgement responder alert when the corresponding incident is resolved, closing the responder alert data object when the corresponding incident is resolved, taking on further action when the corresponding incident is resolved, generating an acknowledgement responder alert when the corresponding incident is closed, closing the responder alert data object when the corresponding incident is closed, taking on further action when the corresponding incident is closed, and/or the like.

While the description above provides some examples of customizing/configuring metadata associated with the global alert policy data objects, it is noted that the scope of the present disclosure is not limited to the description above. In some examples, an example global alert policy creation pane 1500 may provide options on alert time metadata associated with the responder alert data objects, and a user may choose or select when to transmit the alerts or whether to delay/suppress the alerts (e.g. options such as "suppress notifications permanently," "delay notifications for x period of time," "delay notifications until x date and x time," and/or the like).

Referring now to FIG. 15, example user interface elements of an example global alert policy creation pane 1500 in accordance with some embodiments of the present disclosure are illustrated. In particular, FIG. 15 illustrates example user interface elements associated with an example stakeholder configuration section 1501 of the example global alert policy creation pane 1500.

In some embodiments, a user may enable stakeholder communication for the example global alert policy data object by selecting the checkbox in the example stakeholder configuration section 1501. For example, when the stakeholder communication enabled, a user or a group of users associated with the incident (such as, but not limited to, an end user who identified the incident, a manager overseeing a responder who is handling the incident, and/or the like) may receive one or more push notifications, electronic mails, text messages, and/or other types of alerts that are associated with the incident and/or updates associated with resolving the incident. In some embodiments, a user may disable stakeholder communication for the example global alert policy data object by de-selecting the checkbox in the example stakeholder configuration section 1501.

Referring now to FIG. 16, example user interface elements of an example global alert policy creation pane 1600 in accordance with some embodiments of the present disclosure are illustrated. In particular, FIG. 16 illustrates example user interface elements associated with an example associated alert configuration section 1610 of the example global alert policy creation pane 1600.

In some embodiments, an example responder alert data objects may be associated with one or more other responder alert data objects. In some embodiments, the associations between multiple responder alert data objects may be determined based on user inputs. In some embodiments, a user may provide user inputs that define multiple responder alert data objects as being associated with one another. For example, a user may define that multiple responder alert data objects are associated with the same incident, and may provide user inputs that associate these responder alert data objects. As an example, multiple responder alert data objects may be associated with runtime errors in a payment software application, and a user may provide user input defining these responder alert data objects as being associated with one another.

In some embodiments, the example associated alert configuration section 1610 of the example global alert policy creation pane 1600 may enable a user to specify and/or define what to do with other responder alert data object associated with a responder alert data object for an incident when the incident is resolved or closed.

For example, the example associated alert configuration section 1610 shown in FIG. 16 may comprise incident status drop-down menu trigger 1602 and alert status drop-down menus trigger 1604. When a user clicks using a computer mouse, taps via a touch screen, or otherwise selects the incident status drop-down menu trigger 1602, the example global alert policy creation pane 1600 may be updated to display an incident status drop-down menu 1606. In the example shown in FIG. 16, the incident status drop-down menu 1606 may provide options such as, but not limited to, "resolved" (when the incident is resolved) and "closed" (when the incident is closed). When a user clicks using a computer mouse, taps via a touch screen, or otherwise selects the alert status drop-down menus trigger 1604, the example global alert policy creation pane 1600 may be updated to display an alert status drop-down menu 1608. In the example shown in FIG. 16, the alert status drop-down menu 1608 may provide options such as, but not limited to, "acknowledge," "closed," and "no operation." Based at least in part on the incident status drop-down menu 1606 and the alert status drop-down menus 1608, a user may specify or define what to do with associated responder alert data object when a corresponding incident is resolved or closed. For example, the user may specify or define closing the associated responder alert data objects when the corresponding incident is closed, specify or define acknowledging the associated responder alert data objects when the corresponding incident is resolved, and/or the like.

Referring now to FIG. 17, example user interface elements of an example global alert policy creation pane 1700 in accordance with some embodiments of the present disclosure are illustrated. In particular, FIG. 17 illustrates an example global alert policy data object toggle 1701 of the example global alert policy creation pane 1700.

In some embodiments, a user may enable the global alert policy data object by selecting the example global alert policy data object toggle 1701. In some embodiments, a user may disable the global alert policy data object by deselecting the example global alert policy data object toggle 1701. In some embodiments, when the global alert policy data object is disabled, the global alert policy data object is not used to define or generate any responder alert data objects or any inline alert policy data object.

Referring now to FIG. 18, an example incident data object user interface 1800 in accordance with some embodiments of the present disclosure are illustrated.

In the example shown in FIG. 18, the example incident data object user interface 1800 may comprise an incident data object title section 1802 positioned on top of the example incident data object user interface 1800. In some embodiments, the incident data object title section 1802 provides a title associated with the incident data object.

The example incident data object user interface 1800 may comprise an incident data object body section 1806. In some embodiments, the incident data object body section 1806 provides a description or a message associated with the incident data object (for example, a description of the incident).

In the example shown in FIG. 18, the example incident data object user interface 1800 further comprises an inline policy edit button 1804. When a user clicks using a computer mouse, taps via a touch screen, or otherwise select the inline policy edit button 1804, the user interface may be updated to display an inline alert policy edit pane that allows a user to view a rendering of the current inline alert policy data object associated with the incident data object, and/or to provide edits to the inline alert policy data object associated with the incident data object.

As described above, once an incident data object is created, a processing circuitry (such as the processor 305 of the incident alert and management server 107 described above in connection with at least FIG. 1A and FIG. 3) may determine if the incident data object matches any of global alert policy data objects and, if so, generating an inline alert policy data object based on the global alert policy data object and associating the inline alert policy data object with the incident data object. The inline alert policy data object is an anonymous copy of the global alert policy data object that will live and die with the incident data object, and a user can update the inline alert policy data object and it will only affect the current incident data object.

Referring now to FIG. 19, an example inline alert policy edit pane 1900 of an example inline alert policy edit user interface in accordance with some embodiments of the present disclosure is illustrated.

For example, after a user clicks using a computer mouse, taps via a touch screen, or otherwise select an inline policy edit button (such as the inline policy edit button 1804 described above in connection with FIG. 18), the inline alert policy edit pane 1900 may be rendered on the user interface.

In the example shown in FIG. 19, the inline alert policy edit pane 1900 comprises an inline alert policy title section 1901 positioned on top of the inline alert policy edit pane 1900, which may provide a title of the inline alert policy data object. The inline alert policy edit pane 1900 may comprise an alert metadata configuration section 1903 that allows a user to configure alert metadata associated with the inline alert policy data object, similar to the alert metadata configuration section 1107 described above in connection with FIG. 11. The inline alert policy edit pane 1900 may comprise a stakeholder configuration section 1905 that allows a user to configure stakeholder communications associated with the inline alert policy data object, similar to the stakeholder configuration section 1109 described above in connection with FIG. 11. The inline alert policy edit pane 1900 may comprise an associated alert configuration section 1907 that allows a user to configure stakeholder communications associated with the inline alert policy data object, similar to the associated alert configuration section 1111 described above in connection with FIG. 11.

In the example shown in FIG. 19, the inline alert policy edit pane 1900 comprises a cancel button 1919 and a save and re-apply button 1911. When a user clicks using a computer mouse, taps via a touch screen, or otherwise selects the cancel button 1919, user inputs received via the inline alert policy edit pane 1900 may be discarded. When a user clicks using a computer mouse, taps via a touch screen, or otherwise selects the save and re-apply button 1911, the correspond inline alert policy data object may be updated based on the edits received via the inline alert policy edit pane 1900, and responders associated with incident data object may be notified of the update.

As described above, a user can change values associated with the inline alert policy data object and click on the save and re-apply button 1911, and the changed values will only affect the current incident data object without modifying any global alert policy data object. For example, the global alert policy data object defines not to create any responder alert data object, and the user chooses to create alerts via the inline alert policy edit pane 1900, then responder alert data objects will be created. Similarly, if the global alert policy data object was to create responder alert data objects, and the user chooses to not create alerts via the inline alert policy edit pane 1900, the responder alert data objects will be closed. As such, the inline alert policy edit pane 1900 provides the capacity of editing inline alert policy data objects that lives and dies with a particular incident data object.

Referring now to FIG. 20, an example incident data object creation user interface 2000 in accordance with some embodiments of the present disclosure is illustrated.

In some embodiments, the example incident data object creation user interface 2000 comprises an incident data object creation title section 2002, which may provide a title of the example incident data object creation user interface 2000. In some embodiments, the example incident data object creation user interface 2000 may comprise an example creation time metadata configuration section 2004 (similar to the example creation time metadata configuration section 1402 described above in connection with at least FIG. 14). In some embodiments, the example incident data object creation user interface 2000 may comprise a stakeholder configuration section 2006 (similar to the stakeholder configuration section 1501 described above in connection with at least FIG. 15). In some embodiments, the example incident data object creation user interface 2000 may comprise a cancel button 2010 and a create button 2008, similar to the cancel button 1115 and the create button 1117 described above in connection with at least FIG. 11. In the example shown in FIG. 20, a user may define alert policy data object(s) associated with an incident data object when the incident data object is created via the example incident data object creation user interface 2000.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:
   in response to receiving an incident data object associated with an organization identifier, retrieve one or more global alert policy data objects from a global alert policy data repository associated with the organization identifier;
   determine whether a global alert policy data object of the one or more global alert policy data objects corresponds to the incident data object based at least in part on incident metadata associated with the incident data object and condition metadata associated with the one or more global alert policy data objects;
   in response to determining that the global alert policy data object corresponds to the incident data object, generate an inline alert policy data object associated with the incident data object and based at least in part on the global alert policy data object;
   receive, via an inline alert policy edit user interface rendered on a display of a client device associated with the organization identifier, inline alert policy edit metadata associated with alert metadata of the inline alert policy data object; and
   in response to receiving the inline alert policy edit metadata, generate one or more responder alert data objects associated with the incident data object based at least in part on the inline alert policy data object and the inline alert policy edit metadata.

2. The apparatus of claim 1, wherein the at least one non-transitory memory and the program code are configured to, with the at least one processor, cause the apparatus to:
   receive, via a global alert policy creation user interface rendered on the display of the client device, global alert policy creation metadata, wherein the global alert policy creation metadata is associated with the organization identifier;
   generate the one or more global alert policy data objects based at least in part on the global alert policy creation metadata; and
   store the one or more global alert policy data objects in the global alert policy data repository.

3. The apparatus of claim 2, wherein the global alert policy creation metadata defines at least one condition metadata and at least one alert metadata associated with the organization identifier.

4. The apparatus of claim 1, wherein, when generating the inline alert policy data object, the at least one non-transitory memory and the program code are configured to, with the at least one processor, cause the apparatus to:
   replicate the global alert policy data object as the inline alert policy data object; and
   establish a data association between the inline alert policy data object and the incident data object.

5. The apparatus of claim 1, wherein, in response to receiving the incident data object associated with the organization identifier, the at least one non-transitory memory and the program code are configured to, with the at least one processor, cause the apparatus to:

determine, based at least in part on the incident metadata associated with the incident data object, whether to generate the one or more responder alert data objects.

6. The apparatus of claim 5, wherein the at least one non-transitory memory and the program code are configured to, with the at least one processor, cause the apparatus to:
in response to determining not to generate the one or more responder alert data objects, generate a no-alert electronic indication; and
transmit the no-alert electronic indication to the client device associated with the organization identifier.

7. The apparatus of claim 5, wherein the at least one non-transitory memory and the program code are configured to, with the at least one processor, cause the apparatus to:
in response to determining to generate the one or more responder alert data objects, determine a creation time metadata associated with the one or more responder alert data objects, wherein the creation time metadata indicates a creation time associated with the one or more responder alert data objects, and
generate the one or more responder alert data objects at the creation time.

8. A computer-implemented method comprising:
in response to receiving an incident data object associated with an organization identifier, retrieving one or more global alert policy data objects from a global alert policy data repository associated with the organization identifier;
determining whether a global alert policy data object of the one or more global alert policy data objects corresponds to the incident data object based at least in part on incident metadata associated with the incident data object and condition metadata associated with the one or more global alert policy data objects;
in response to determining that the global alert policy data object corresponds to the incident data object, generating an inline alert policy data object associated with the incident data object and based at least in part on the global alert policy data object;
receiving, via an inline alert policy edit user interface rendered on a display of a client device associated with the organization identifier, inline alert policy edit metadata associated with alert metadata of the inline alert policy data object; and
in response to receiving the inline alert policy edit metadata, generating one or more responder alert data objects associated with the incident data object based at least in part on the inline alert policy data object and the inline alert policy edit metadata.

9. The computer-implemented method of claim 8, wherein the computer-implemented method further comprises:
receiving, via a global alert policy creation user interface rendered on the display of the client device, global alert policy creation metadata, wherein the global alert policy creation metadata is associated with the organization identifier;
generating the one or more global alert policy data objects based at least in part on the global alert policy creation metadata; and
storing the one or more global alert policy data objects in the global alert policy data repository.

10. The computer-implemented method of claim 9, wherein the global alert policy creation metadata defines at least one condition metadata and at least one alert metadata associated with the organization identifier.

11. The computer-implemented method of claim 8, wherein, when generating the inline alert policy data object, the computer-implemented method further comprises:
replicating the global alert policy data object as the inline alert policy data object; and
establishing a data association between the inline alert policy data object and the incident data object.

12. The computer-implemented method of claim 8, wherein, in response to receiving the incident data object associated with the organization identifier, the computer-implemented method further comprises:
determining, based at least in part on the incident metadata associated with the incident data object, whether to generate the one or more responder alert data objects.

13. The computer-implemented method of claim 12, wherein the computer-implemented method further comprises:
in response to determining not to generate the one or more responder alert data objects, generating a no-alert electronic indication; and
transmitting the no-alert electronic indication to the client device associated with the organization identifier.

14. The computer-implemented method of claim 12, wherein the computer-implemented method further comprises:
in response to determining to generate the one or more responder alert data objects, determining a creation time metadata associated with the one or more responder alert data objects, wherein the creation time metadata indicates a creation time associated with the one or more responder alert data objects, and
generating the one or more responder alert data objects at the creation time.

15. A computer program product comprising at least one non-transitory computer-readable storage medium having computer-readable program code portions stored therein, the computer-readable program code portions comprising an executable portion configured to:
in response to receiving an incident data object associated with an organization identifier, retrieve one or more global alert policy data objects from a global alert policy data repository associated with the organization identifier;
determine whether a global alert policy data object of the one or more global alert policy data objects corresponds to the incident data object based at least in part on incident metadata associated with the incident data object and condition metadata associated with the one or more global alert policy data objects;
in response to determining that the global alert policy data object corresponds to the incident data object, generate an inline alert policy data object associated with the incident data object and based at least in part on the global alert policy data object;
receive, via an inline alert policy edit user interface rendered on a display of a client device associated with the organization identifier, inline alert policy edit metadata associated with alert metadata of the inline alert policy data object; and
in response to receiving the inline alert policy edit metadata, generate one or more responder alert data objects associated with the incident data object based at least in part on the inline alert policy data object and the inline alert policy edit metadata.

16. The computer program product of claim 15, wherein the computer-readable program code portions comprise the executable portion configured to:

receive, via a global alert policy creation user interface rendered on the display of the client device, global alert policy creation metadata, wherein the global alert policy creation metadata is associated with the organization identifier;

generate the one or more global alert policy data objects based at least in part on the global alert policy creation metadata; and store the one or more global alert policy data objects in the global alert policy data repository.

17. The computer program product of claim 16, wherein the global alert policy creation metadata defines at least one condition metadata and at least one alert metadata associated with the organization identifier.

18. The computer program product of claim 15, wherein, when generating the inline alert policy data object, the computer-readable program code portions comprise the executable portion configured to:

replicate the global alert policy data object as the inline alert policy data object; and establish a data association between the inline alert policy data object and the incident data object.

19. The computer program product of claim 15, wherein, in response to receiving the incident data object associated with the organization identifier, the computer-readable program code portions comprise the executable portion configured to:

determine, based at least in part on the incident metadata associated with the incident data object, whether to generate the one or more responder alert data objects.

20. The computer program product of claim 19, wherein the computer-readable program code portions comprise the executable portion configured to:

in response to determining not to generate the one or more responder alert data objects, generate a no-alert electronic indication; and transmit the no-alert electronic indication to the client device associated with the organization identifier.

* * * * *